United States Patent
Kim et al.

(10) Patent No.: US 11,360,601 B2
(45) Date of Patent: Jun. 14, 2022

(54) TOUCH DISPLAY DEVICE WITH A UNIFORM INTERVAL BETWEEN TOUCH DRIVING PERIODS AND TOUCH DRIVING METHOD THEREOF

(71) Applicant: LG Display Co., Ltd., Seoul (KR)

(72) Inventors: YoungGyu Kim, Gyeonggi-do (KR); Hyunsuk Cho, Gyeonggi-do (KR); NamYong Gong, Gyeonggi-do (KR); HyungUk Jang, Gyeonggi-do (KR); DoYoung Jung, Seoul (KR); Jongsung Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/078,544

(22) Filed: Oct. 23, 2020

(65) Prior Publication Data
US 2021/0124473 A1    Apr. 29, 2021

(30) Foreign Application Priority Data
Oct. 28, 2019    (KR) .................. 10-2019-0134267

(51) Int. Cl.
*G06F 3/041*    (2006.01)

(52) U.S. Cl.
CPC ........ *G06F 3/04162* (2019.05); *G06F 3/0412* (2013.01); *G06F 3/04166* (2019.05)

(58) Field of Classification Search
CPC . G06F 3/04162; G06F 3/04166; G06F 3/0412
See application file for complete search history.

(56) References Cited

U.S. PATENT DOCUMENTS

2017/0108970 A1* 4/2017 Kim ..................... G09G 3/2092
2018/0188836 A1* 7/2018 Park .................... G06F 3/03545

* cited by examiner

*Primary Examiner* — Lisa S Landis
(74) *Attorney, Agent, or Firm* — Morgan, Lewis & Bockius LLP

(57) ABSTRACT

Embodiments of the present disclosure relate to a touch circuit, a touch display device, and a touch driving method, and more specifically, to a touch circuit, a touch display device, and a touch driving method for simply configuring a system for transmitting signals between a touch display device and a stylus by uniformly arranging intervals between touch driving periods in a touch frame.

19 Claims, 18 Drawing Sheets

TOUCH DISPLAY DEVICE WITH A UNIFORM INTERVAL BETWEEN TOUCH DRIVING PERIODS AND TOUCH DRIVING METHOD THEREOF

CROSS-REFERENCE TO RELATED APPLICATION

This application claims the priority benefit of Korean Patent Application No. 10-2019-0134267, filed on Oct. 28, 2019 in the Korean Intellectual Property Office, the disclosure of which is incorporated herein by reference in its entirety.

BACKGROUND

Technical Field

The present disclosure relates to touch circuits, touch display devices and touch driving methods.

Discussion of the Related Art

As the information-oriented society has been developed, various needs for display devices for displaying an image have increased. Recently, various types of display devices, such as a Liquid Crystal Display (LCD) device, a Plasma Display Panel (PDP) device, and an Organic Light Emitting display device, have been utilized.

The liquid crystal display device among the display devices displays images by adjusting the light transmittance of a liquid crystal using electric fields. To do this, the liquid crystal display device usually includes a liquid crystal display panel on which liquid crystal cells are arranged in a matrix form, and a driving circuit for driving the liquid crystal display panel.

A plurality of data lines and a plurality of gate lines intersect each other in arrays of pixels of the liquid crystal display panel, and a thin film transistor (TFT) for driving the liquid crystal cell is formed in an area in which each gate line and each data line intersect. Further, a storage capacitor for remaining a voltage of a liquid crystal cell at a certain level is formed in the liquid crystal display panel, and the liquid crystal cell includes a pixel electrode, a common electrode and a liquid crystal layer. Electric fields are formed through the liquid crystal layer included in the liquid crystal cells by a data voltage applied to the pixel electrode and a common voltage applied to the common electrode. At this time, an amount of light transmitting through the liquid crystal layer can be adjusted by the electric fields; thus, images can be produced.

The driving circuit can include a gate driving circuit for sequentially providing gate signals to the gate lines, and a data driving circuit for providing image signals (i.e. data voltages) to data lines. The data driving circuit can provide data voltages to the liquid crystal cells by driving the data lines. The gate driving circuit selects on one horizontal line basis the liquid crystal cells of the display panel to which data voltages are provided by sequentially driving the gate lines.

To generate gate signals sequentially, the gate driving circuit includes a gate shift register configured with multiple stages. Each stage of the shift register alternately performs charging and discharging; as a result, outputs a gate output signal including a gate clock signal of a low voltage level. Output ends of stages are connected to the gate lines on a one-to-one basis, respectively. Gate signals of a first level are sequentially generated from the stages once for each frame, and then provided to respective gate lines GL.

Meanwhile, in providing a touch input function in display devices, for providing thin portable devices, such as a smart phone, a tablet PC, or the like, an in-cell type touch display device in which components for a touch screen are integrated inside of the display panel of the touch display device has been developed and utilized.

Such a touch display device uses the common electrode for driving each pixel as a touch electrode for touch sensing. Accordingly, during a display period, a common voltage is provided to at least one thin film transistor, and during a touch period, a touch driving signal is provided to at least one touch electrode.

In the touch display device, driving for a touch is normally driven only once during one frame, which is an image refresh rate of a display panel or one cycle of a frame frequency.

For example, when the frame frequency is 60 Hz, after performing display driving that turns one or more pixels on or off through N gate lines constituting a touch screen panel (TSP) within a horizontal period of $\frac{1}{60}$ s, then, touch driving for touch sensing is performed during a pre-configured interval. In other words, this may be represented as the touch report rate of 60 Hz.

Meanwhile, for a touch input for the touch display device, not only a passive stylus such as a finger, but an active stylus capable of transmitting signals to, and/or receiving signals from, the display panel may be used.

In the case of using the active stylus, the touch display device transmits a beacon signal or a ping signal including information on the display panel to the active stylus, and then, the active stylus can determine a state of the display panel and perform a process of synchronization.

Normally, since the beacon signal or ping signal with an asymmetric interval has been used for transmitting from the touch display device to the active stylus, thus, the complexity of signal processing increases, and there sometimes occur problems that noises are included in the process of synchronization between the active stylus and the touch display device.

SUMMARY

Accordingly, embodiments of the present disclosure are directed to a touch circuit, a touch display device, and a touch driving method that substantially obviate one or more of the problems due to limitations and disadvantages of the related art.

In accordance with embodiments of the present disclosure, a touch circuit, a touch display device, and a touch driving method are provided for simply configuring a system for transmitting signals between the touch display device and a stylus by uniformly arranging intervals between touch driving periods in a touch frame.

In accordance with embodiments of the present disclosure, a touch circuit, a touch display device, and a touch driving method are provided for reducing the number of ping signals in a touch frame period and reducing power consumption of a stylus by uniformly arranging intervals between touch driving periods in the touch frame.

In accordance with embodiments of the present disclosure, a touch circuit, a touch display device, and a touch driving method are provided for improving touch sensitivity by uniformly arranging intervals between touch driving periods in the touch frame.

In accordance with embodiments of the present disclosure, a touch circuit, a touch display device, and a touch driving method are provided, even when noises are included in a period in which a beacon signal is transmitted, for enabling synchronization between touch display device and a stylus to be maintained in one or more remaining periods by uniformly arranging intervals between touch driving periods in the touch frame.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

In accordance with one aspect of the present disclosure, a touch display device is provided that includes a display panel in which a touch screen panel including a plurality of touch electrodes is embedded, and a touch circuit generating a touch synchronization signal in which intervals between a plurality of touch driving periods are uniform, in a touch frame period including a vertical blank period, and providing a touch driving signal to the display panel according to the generated touch synchronization signal.

The touch circuit may generate the touch synchronization signal in which the intervals between the plurality of touch driving periods are uniform by dividing the vertical blank period into a number of time intervals which is equal to the number of the plurality of touch driving periods included in the touch frame period and adding the divided time intervals into the respective touch driving periods.

The touch driving signal is an uplink signal provided to a stylus through the display panel and may include a first beacon signal provided in a first touch driving period and a second beacon signal provided in a second touch driving period, in the touch frame period.

The intervals between the plurality of touch driving periods may correspond to an interval between the first beacon signal and the second beacon signal.

The touch driving signal is an uplink signal provided to a stylus through the display panel and may include a beacon signal provided in a first touch driving period and a ping signal provided in a second touch driving period, in the touch frame period. In this case, the ping signal may not be provided after the second touch driving period in the touch frame period.

The intervals between the plurality of touch driving periods may correspond to an interval between the beacon signal and the ping signal.

A touch driving signal provided in the second touch driving period in which the ping signal is included may be a direct current signal.

The touch circuit may provide, in a touch driving period in which a beacon signal is not provided, a touch driving signal for sensing a downlink signal provided from a stylus at a time at which a certain offset time passes from the interval between the plurality of touch driving periods.

In accordance with another aspect of the present disclosure, a touch circuit is provided that includes a pulse width modulation generator generating a touch synchronization signal in which intervals between a plurality of touch driving periods are uniform in a touch frame period including a vertical blank period and providing the touch synchronization signal to a display panel including a plurality of touch electrodes, a touch controller controlling operations of the pulse width modulation generator, and an interface processor providing interface signals between the touch controller and a driving circuit of the display panel.

In accordance with further another aspect of the present disclosure, a touch driving method is provided that includes generating a touch synchronization signal in which intervals between a plurality of touch driving periods are uniform in a touch frame period including a vertical blank period, and providing a touch driving signal to the display panel according to the generated touch synchronization signal.

In accordance with embodiments of the present disclosure, it is possible to provide a touch circuit, a touch display device, and a touch driving method for simply configuring a system for transmitting signals between the touch display device and a stylus.

In accordance with embodiments of the present disclosure, it is possible to provide a touch circuit, a touch display device, and a touch driving method for reducing the number of transmitted ping signals in a touch frame period and reducing power consumption of a stylus.

In accordance with embodiments of the present disclosure, it is possible to provide a touch circuit, a touch display device, and a touch driving method for improving touch sensitivity.

In accordance with embodiments of the present disclosure, it is possible to provide a touch circuit, a touch display device, and a touch driving method, even when noises are included in a period in which a beacon signal is transmitted, for enabling synchronization between touch display device and a stylus to be maintained in one or more remaining periods.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles.

DETAILED DESCRIPTION

Figure 1:
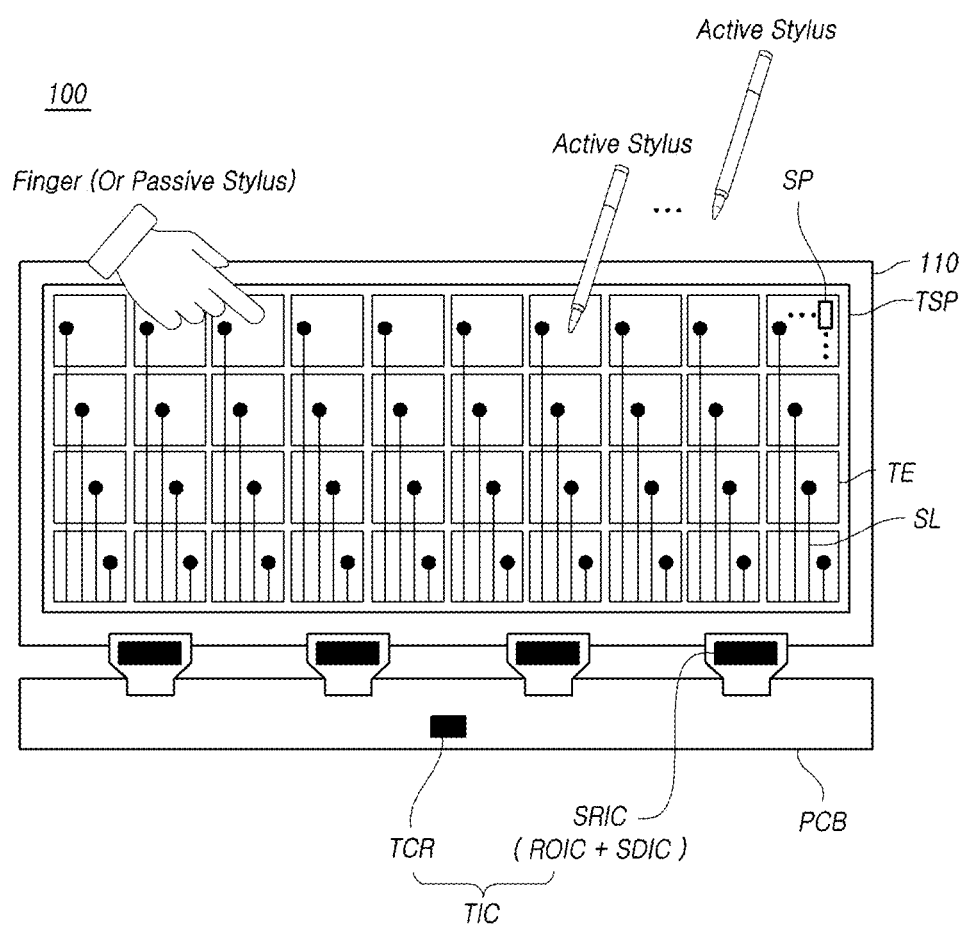
FIG. 1 illustrates a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 illustrates a block diagram of the touch display device according to embodiments of the present disclosure.

Referring to FIG. 1, the touch display device 100 according to embodiments of the present disclosure may be, for example, a display device capable of providing a function of sensing a touch of a passive stylus such as a finger, a conductive object, or the like, and a function of sensing a touch of an active stylus such as a pen, in addition to a function of displaying images.

The touch display device 100 according to embodiments of the present disclosure may be a display device in which a touch screen panel TSP including a plurality of touch electrodes TE as touch sensors is embedded into a display panel 110. For example, the touch display device 100 may be a television TV, a monitor, or the like, or a mobile device such as a tablet, a smart phone, or the like.

For example, the touch display device 100 may divide a common electrode used in a display period into a plurality of groups and then use the plurality of divided groups as a plurality of touch electrodes TE.

In another example, the touch display device 100 may use a plurality of touch electrodes TE as touch sensing electrodes or touch driving electrodes.

The display panel 110 may be a liquid crystal display (LCD) panel, an organic light emitting diode (OLED) panel, or the like.

For example, when the display panel 110 is the liquid crystal display panel, the touch display device 100 may divide a common electrode, to which a common voltage is applied, which forms electric fields with pixel electrodes into a plurality of groups and then use the plurality of divided groups as respective touch electrodes TE.

In another example, when the display panel 110 is the organic light emitting diode (OLED) panel, the touch display device 100 may include an organic light emitting diode (OLED) composed of a first electrode, an organic light emitting layer, and a second electrode, an encapsulation layer located on the OLED and having a encapsulating function, and a touch sensor metal layer located on the encapsulation layer. Here, a plurality of touch electrodes may be formed on the touch sensor metal layer.

Hereinafter, for convenience of description and ease of understanding, it is assumed that a plurality of touch electrodes TE are used as touch driving electrodes (touch sensors) in the process of touch driving, and are used as a common electrode in the process of display driving.

The touch display device 100 may include a touch circuit TIC performing touch sensing and stylus sensing using signals received through the display panel 110 by driving the display panel 110 in which the touch screen panel TSP is integrated.

The touch circuit TIC may include a first circuit for receiving signals through the display panel 110 by driving the display panel 110, and a second circuit for performing passive touch sensing (e.g., finger touch sensing) and active touch sensing using the signals received through the display panel 110.

The first circuit may be referred to as a touch driving circuit ROIC, and the second circuit may be referred to as a touch controller TCR.

The touch driving circuit ROIC may be implemented as an integrated driving circuit SRIC together with a data driving circuit SDIC driving data lines.

The integrated driving circuit SRIC may be implemented in a type of Chip On Film (COF) in which the integrated driving circuit SRIC is mounted on a film.

The film on which the integrated driving circuit SRIC is mounted may be attached to a bonding portion of the display panel 110 and a bonding portion of a printed circuit board PCB.

The touch controller TCR etc. may be mounted on the printed circuit board PCB.

The touch driving circuit ROIC and the data driving circuit SDIC may be implemented as separate driving chips. The touch driving circuit ROIC may be electrically connected to the plurality of touch electrodes TE included in the display panel 110 through a plurality of signal lines SL.

At this time, the touch driving circuit ROIC may perform touch sensing during a touch period from a display period separately divided in time. In another example, the touch driving circuit ROIC may perform touch sensing process and display driving process simultaneously, and in this case, the touch period may have a time period equal to the display period.

Figure 2:
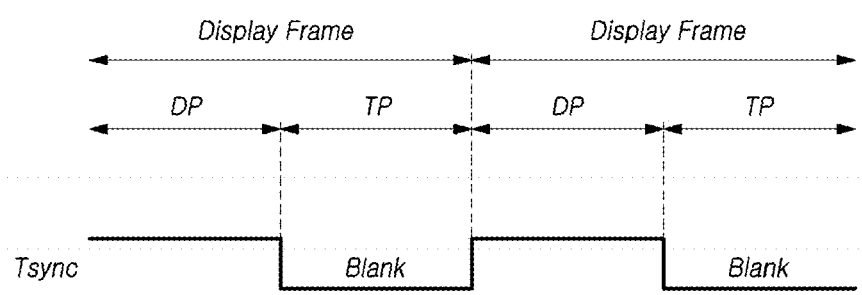
FIG. 2 illustrates timings for configuring a display driving period and a touch driving period in the touch display device according to embodiments of the present disclosure.

FIG. 2 illustrates timings for configuring a display driving period and a touch driving period in the touch display device according to embodiments of the present disclosure.

Referring to FIG. 2, touch display device 100 according to embodiments of the present disclosure performs display driving for displaying images during the predefined display driving period DP, and performs touch driving for sensing a touch input from a finger or a stylus during the predefined touch driving period TP.

The display driving period DP and the touch driving period TP may be equal in time, all or partly overlap with each other in time, or be separated from each other in time.

When the display driving period DP and the touch driving period TP are equal in time, the display driving and the touch driving may be performed simultaneously.

Hereinafter, for convenience of description, it is assumed that the display driving period DP and the touch driving period TP are separated from each other in time. In this case, the display driving period DP and the touch driving period TP may be alternately arranged.

Thus, when the display driving period DP and the touch driving period TP are separated in time while alternately being arranged, the touch driving period TP may correspond to a blank period Blank in which the display driving is not performed.

The touch display device 100 may generate a touch synchronization signal Tsync swang between a high level and a low level, and through this, may identify or control the display driving period DP and the touch driving period TP. That is, the touch synchronization signal Tsync may be a driving timing control signal for defining the touch driving period TP.

For example, a high level period (or a low level period) of the touch synchronization signal Tsync may be corresponded to the display driving period DP, and the low level period (or the high level period) of the touch synchronization signal Tsync may be corresponded to the touch driving period TP.

Meanwhile, with respect to methods of assigning the display driving period DP and the touch driving period TP in one display frame period, for example, one display frame period may be divided into one display driving period DP and one touch driving period TP, and display driving may be performed during one display driving period DP, and touch driving for sensing a touch input from a finger and a stylus may be performed during one touch driving period TP corresponding to a blank period Blank.

In another example, one display frame period may be divided into two or more display driving periods DP and two or more touch driving periods TP, and display driving may be performed during two or more display driving periods DP in one display frame period, and touch driving for sensing once or two or more times a touch input from a finger and a stylus on all or at least a part of a display screen may be performed during two or more touch driving periods TP in one display frame period.

Like this, when dividing one display frame period into two or more display driving periods DP and two or more touch driving periods TP, and then performing the display driving and the touch driving, each of two or more blank periods corresponding to two or more touch driving periods TP in one display frame period is sometimes referred to as a long horizontal blank ("LHB").

Accordingly, two or more periods in which the sensing of a touch from a stylus or a finger is performed in a display frame period may be referred to as LHBs or touch driving periods, and touch driving performed during two or more LHBs in one touch frame period (which will be described below by referring to FIG. 4) is referred to as "LHB driving".

Figure 3:
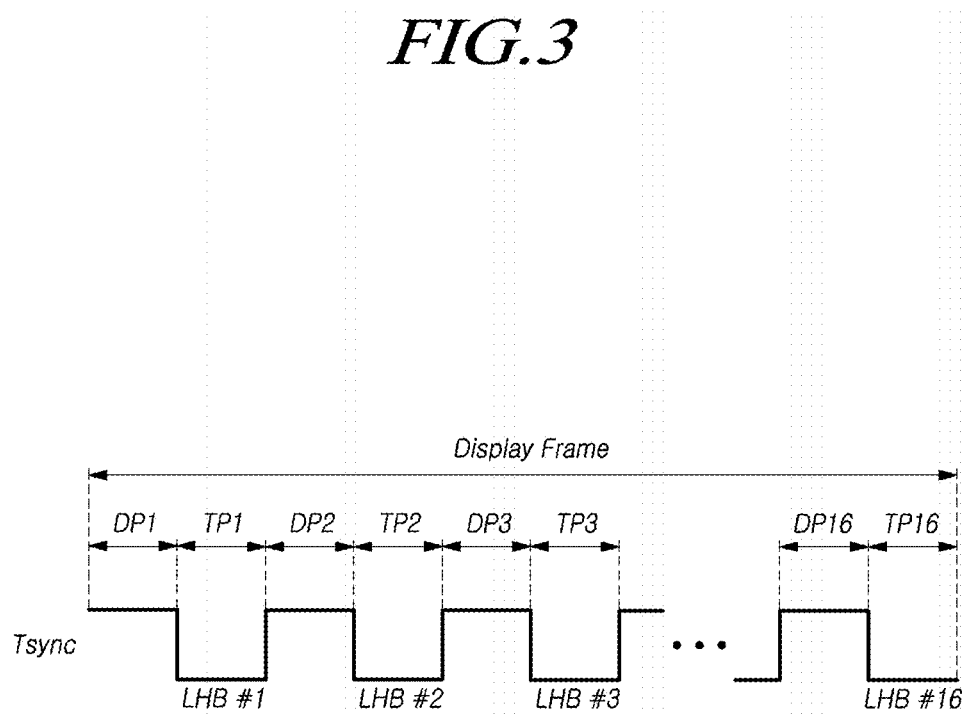
FIG. 3 illustrates that one display frame period is divided into, in time, a plurality of display driving periods and a plurality of touch driving periods in the touch display device according to embodiments of the present disclosure.

FIG. 3 illustrates timing when one display frame period is divided into, in time, a plurality of display driving periods and a plurality of touch driving periods in the touch display device according to embodiments of the present disclosure.

Referring to FIG. 3, one display frame period may be divided into 16 display driving periods (DP1~DP16) and 16 touch driving periods (TP1~TP16) in time.

In this case, the 16 touch driving periods (TP1~TP16) may correspond to 16 LHBs (LHB1~LHB16).

In the touch display device 100 according to embodiments of the present disclosure, display driving and touch driving may be alternately performed in a state where one display frame period is divided into one or more display driving periods and one or more touch driving periods.

In another example, in the touch display device 100 according to embodiments of the present disclosure, the touch driving period TP may be performed independently of display driving period DP.

Figure 4:
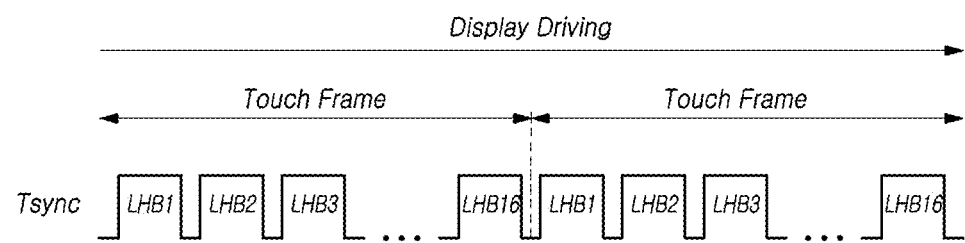
FIG. 4 illustrates a touch driving timing that is independent of a display driving timing in the touch display device according to embodiments of the present disclosure.

FIG. 4 illustrates a touch driving timing that is independent of a display driving timing in the touch display device according to embodiments of the present disclosure.

Referring to FIG. 4, in the touch display device 100 according to embodiments of the present disclosure, display driving process and touch driving process may be performed in different times from each other or performed simultaneously.

Accordingly, a touch synchronization signal Tsync may be served to distinguish between a display driving period DP and a touch driving period TP, or indicate only the touch driving period TP through separating.

For example, 16 LHBs (LHB1~LHB16) may correspond to one touch frame period. Here, the touch frame period may mean a period in which a touch from a finger or a stylus on the whole area of the display screen can be sensed once.

Here, the example is illustrated in which touch driving is performed in a period in which the touch synchronization signal Tsync is maintained in a high level, and in another example, the touch driving may be performed in a period in which the touch synchronization signal Tsync is maintained in a low level. The display driving and the touch driving may be performed simultaneously or performed by being divided in time.

Further, in touch driving periods (LHB1~LHB16), touch driving process for sensing a touch from a finger may be performed, or touch driving process for sensing a touch from a stylus may be performed.

Figure 5:
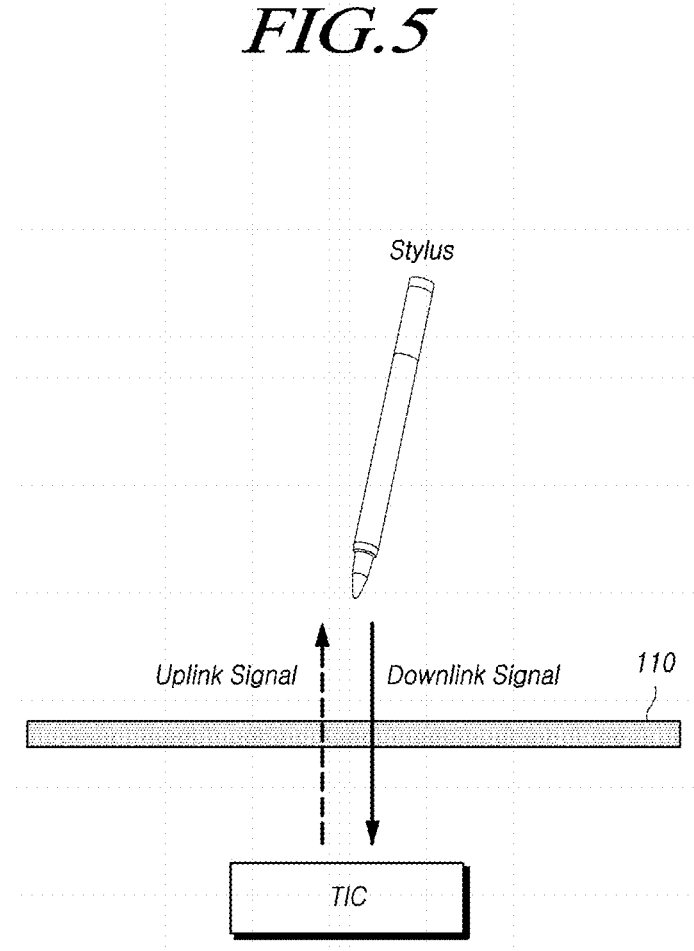
FIG. 5 illustrates operations between the touch display device according to embodiments of the present disclosure and a stylus.

FIG. 5 illustrates operations between the touch display device according to embodiments of the present disclosure and a stylus.

Referring to FIG. 5, when driving touch sensors, such as touch electrodes, for sensing a touch from a stylus, the touch display device 100 may transmit, to the stylus, at least one uplink signal including several types of information for controlling the driving of the stylus or several types of information needed for driving the stylus.

More specifically, a touch circuit TIC of the touch display device 100 may supply at least one uplink signal including several types of information for controlling the driving of the stylus or several types of information needed for driving the stylus to one or more of touch electrodes TE included in the display panel 110.

According to this, a stylus adjacent to the display panel 110 may receive the at least one uplink signal through a tip of the stylus. That is, the stylus may receive the at least one uplink signal through one or more of the plurality of touch electrodes TE included in the display panel 110.

The stylus may output a downlink signal indicating a location, a tilt, or several types of additional information on the stylus in response to the at least one uplink signal transmitted from the touch display device 100.

The downlink signal output from the stylus may be applied to at least one touch electrode TE of the plurality of touch electrodes TE included in the display panel 110.

The touch circuit TIC of the touch display device 100 may receive the downlink signal output from the stylus through the at least one touch electrode TE, and obtain the location, the tilt, or the several types of additional information on the stylus based on the received downlink signal.

Here, the uplink signal may include, for example, a beacon signal Beacon, a ping signal Ping, or the like.

The beacon signal Beacon may be a control signal for enabling the touch display device 100 to control the driving of the stylus or inform the stylus of necessary information, and include several types of information needed to drive the stylus.

For example, the beacon signal Beacon may include one or more of basic information of the display panel 110 (e.g., state information, identification information, type information such as in-cell type, or the like), driving mode information of the display panel 110 (e.g., mode identification information, such as stylus search mode, stylus sensing mode, or the like), characteristic information on a downlink signal (e.g., frequency, the number of pulses, or the like), driving timing related information, multiplexer driving information, power mode information (e.g., information on one or more LHB(s) not driven in a display panel and a stylus for reducing power consumption), and may further include information for synchronization between the display panel 110 and the stylus.

The ping signal Ping may be a control signal for synchronization of a downlink signal.

The additional information that can be included in the downlink signal may include, for example, one or more of pressure, stylus ID information, button information, battery information, and information for checking and correcting errors for information.

Figure 6:
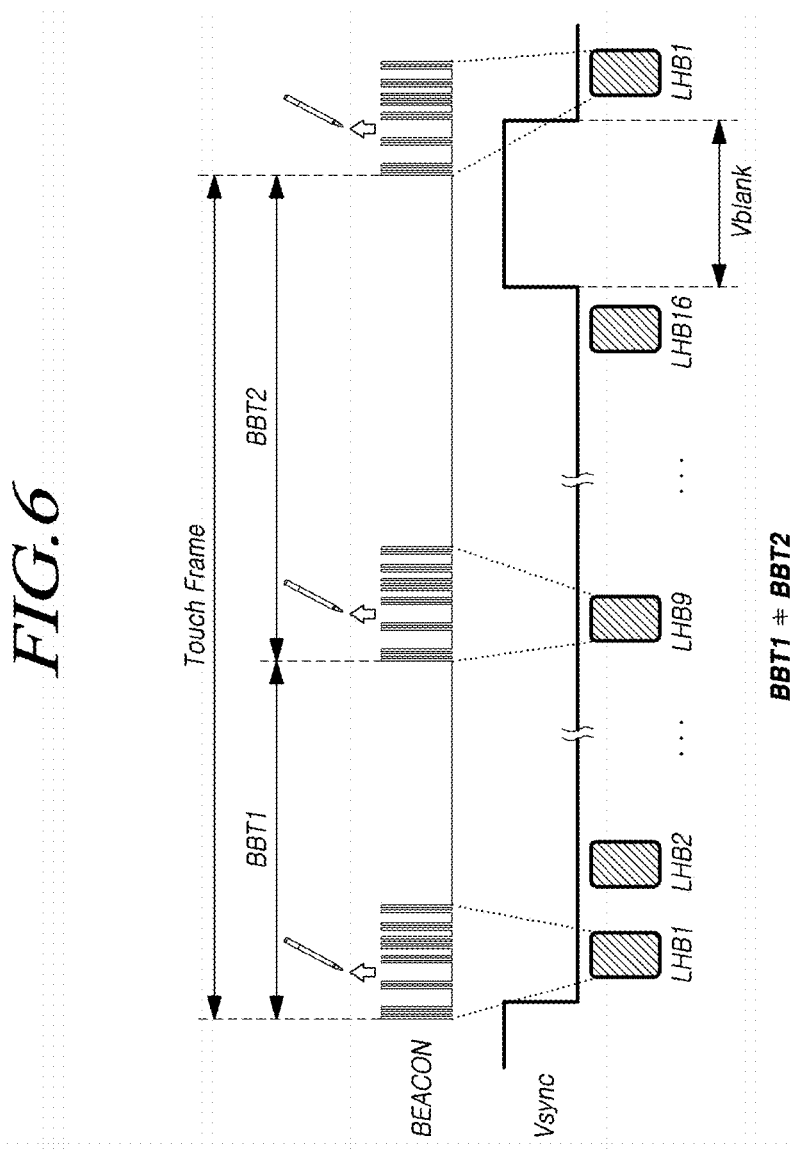
FIG. 6 illustrates an example of a timing at which touch driving for a stylus is performed in a touch display system according to embodiments of the present disclosure.

FIG. 6 illustrates an example of a timing at which touch driving for a stylus is performed in a touch display system according to embodiments of the present disclosure.

In FIG. 6, a display frame period may correspond to a touch frame period, and each touch frame period may include 16 LHBs (LHB1~LHB16). Here, the touch frame period may be a period for sensing both an passive conductive object such as a finger, and a stylus.

In the touch frame period, a beacon signal, which is one of uplink signals, may be transmitted from the display panel 110 to the stylus one or more times. The beacon signal may be transmitted in any touch driving period of 16 LHBs (LHB1~LHB16).

For example, a beacon signal may be transmitted to the stylus in a first LHB LHB1 and a ninth LHB LHB9 of 16 LHBs (LHB1~LHB16) included in a touch frame.

When the beacon signal is transmitted from the display panel 110 to the stylus, the stylus may output a downlink signal in a pre-configured touch driving period according to a predefined protocol in response to the beacon signal.

The downlink signal output from the stylus may be a downlink signal for enabling the touch display device 100 to sense a location of the stylus or to sense data of the stylus. Here, the data of the stylus may be several types of information on the stylus, such as, pressure, a stylus ID, button information, battery information, information for checking and correcting errors for information, and the like.

The downlink signal output from the stylus may be applied to at least one touch electrode TE of the plurality of touch electrodes TE included in the display panel 110.

Meanwhile, 16 LHBs (LHB1~LHB16) included in the touch frame period may include one or more active driving periods for enabling a location or data of the stylus to be sensed. For example, the active driving periods may correspond to LHB2 to LHB3 (LHB2~LHB3), LHB5 to LHB7 (LHB5~LHB7), LHB10 to LHB11 (LHB10~LHB11), and LHB13 to LHB15 (LHB13~LHB15) among the 16 LHBs (LHB1~LHB16).

Like this, the stylus may output a downlink signal in line with one or more active driving periods (e.g., LHB2~LHB3, LHB5~LHB7, LHB10~LHB11, LHB13~LHB15) assigned for sensing the stylus.

When the downlink signal output from the stylus is a downlink signal for the location of the stylus, the downlink signal may be a signal made up of pulses swing periodically.

When the downlink signal output from the stylus is a downlink signal for the data of the stylus, the downlink signal may be a signal made up of aperiodic pulses indicating the corresponding data.

Meanwhile, the 16 LHBs (LHB1~LHB16) included in the touch frame period may include one or more passive driving periods for sensing a touch from a finger. For example, the passive driving periods may correspond to LHB4, LHB8, LHB12, and LHB16 among the 16 LHBs (LHB1~LHB16).

As described above, according to a stylus sensing timing defined in the corresponding protocol, when a downlink signal is output from the stylus, the touch circuit TIC may receive the downlink signal through the display panel 110, and perform a stylus sensing process based on the received downlink signal.

Here, the process of stylus sensing may include one or more of a process of sensing a location of the stylus, and a process of sensing data of the stylus.

Further, according to a finger sensing timing defined in the corresponding protocol, the touch circuit TIC may supply a touch driving signal to at least one of a plurality of touch electrodes TE of the display panel 110, and receive a sensing signal from the display panel 110, and thus perform a finger sensing process for sensing a touch from a finger.

For discerning frames, a vertical blank period Vblank is arranged between the touch frame periods for sensing a stylus or a finger, and because of this, there occurs an asymmetric phenomenon in which intervals between adjacent LHBs that are arranged in the touch frame periods are not equal.

Figure 7:
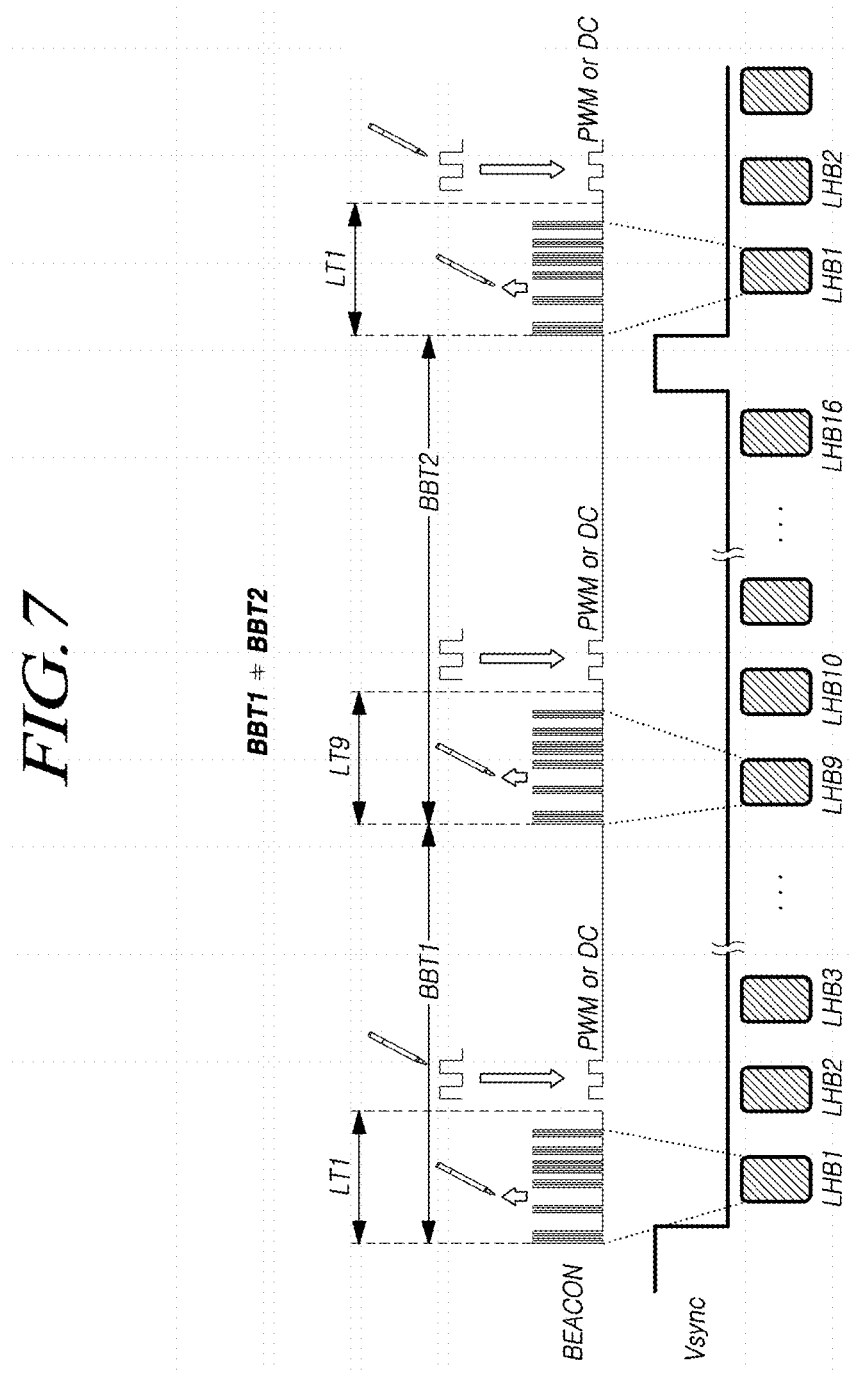
FIG. 7 illustrates an example of an asymmetric phenomenon in which intervals between LHBs are not equal in a touch frame period in a touch display device.

FIG. 7 illustrates an example of an asymmetric phenomenon in which intervals between adjacent LHBs are not equal in touch frame periods in a touch display device.

Referring to FIG. 7, for discerning frames, a vertical blank period Vblank is arranged between touch frame periods.

16 LHBs (LHB1~LHB16) for touch driving may be arranged in a remaining period except for the vertical blank period Vblank within a touch frame period. Due to such an arrangement, there occurs an asymmetric phenomenon in which intervals between adjacent LHBs of 16 LHBs (LHB1~LHB16) arranged in a touch frame period and an interval between a 16th LHB LHB16 and a first LHB LHB1 in a consecutive touch frame period are not consistent.

For example, when beacon signals are included in a first LHB LHB1 and a 9th LHB LHB9, a time interval BBT1 between the beacon signal of the first LHB LHB1 and the beacon signal of the 9th LHB LHB9 is different from a time interval BBT2 between the beacon signal of the 9th LHB LHB9 and a beacon signal of a first LHB LHB1 in a consecutive touch frame period.

At this time, the time interval BBT1 between the beacon signal of the first LHB LHB1 and the beacon signal of the 9th LHB LHB9 and the time interval BBT2 between the beacon signal of the 9th LHB LHB9 and the beacon signal of the first LHB LHB1 in the consecutive touch frame period have different values due to the vertical blank period Vblank; therefore, intervals (LT1~LT15) between adjacent LHBs from the first LHB LHB1 to the 16th LHB LHB16 and an interval LT16 between the 16th LHB LHB16 and the first LHB LHB1 in the consecutive touch frame period can be different from each other.

Due to such an asymmetric phenomenon, there occurs a problem that an associated system for transmitting signals between the touch display device 100 and the stylus becomes complicated. Further, in order to reduce an LHB asymmetric period, it is necessary for a plurality beacon signals Beacon to be transmitted in one touch frame period; thus, power consumption of the stylus is increased and corresponding touch sensing period is reduced, leading touch sensitivity to be deteriorated.

In accordance with embodiments of the present disclosure, regardless of the vertical blank period Vblank, by equally arranging an interval between LHBs in a touch frame period, it is possible to simplify a system transmitting a signal transmitted between the touch display device 100 and the stylus and improve touch sensitivity while reducing power consumption of the stylus.

Figure 8:
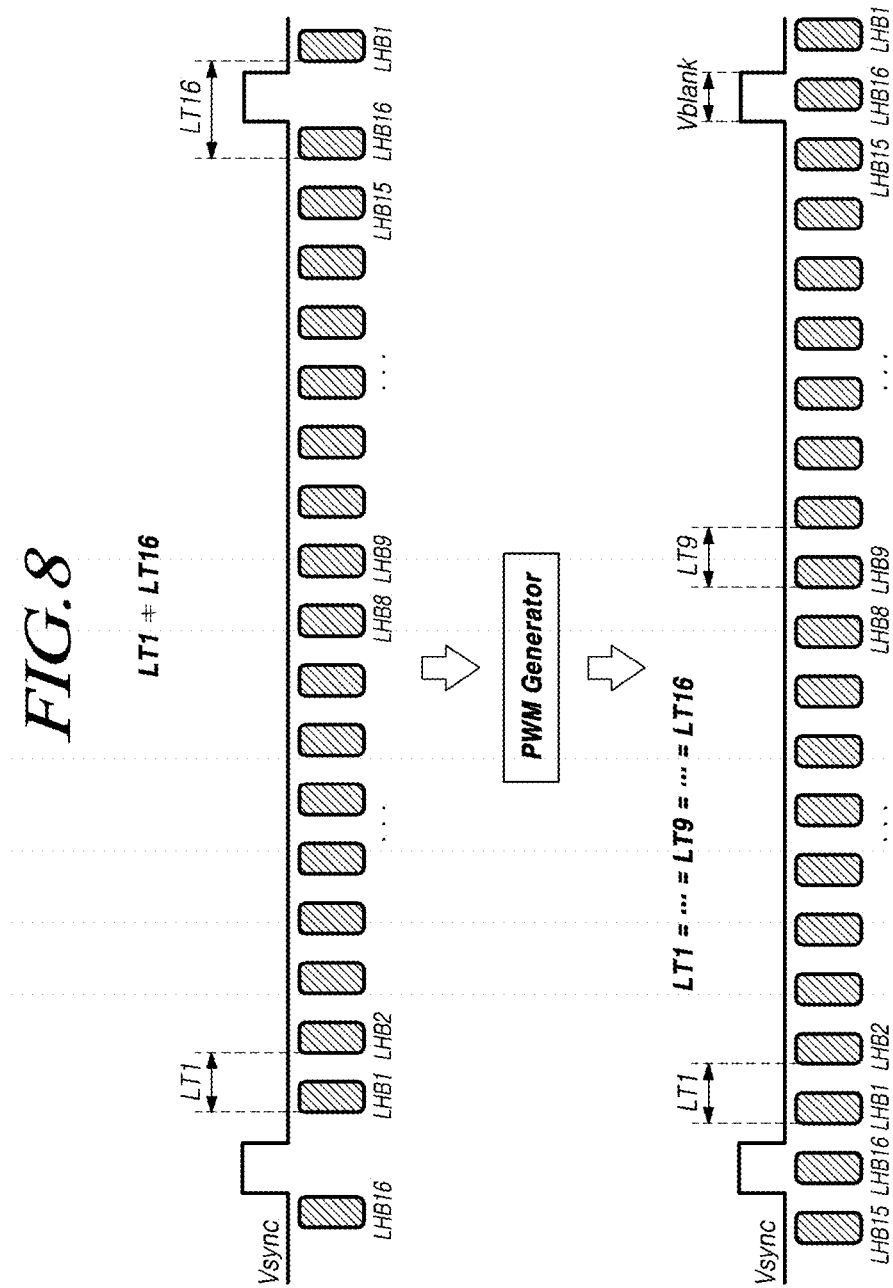
FIG. 8 illustrates an example of signal timing for explaining a method of arranging LHBs such that intervals between adjacent LHBs in touch frame periods are equal through a modulation of touch synchronization signal in the touch display device according to embodiments of the present disclosure.

FIG. 8 illustrates an example of signal timing for explaining a method of arranging LHBs such that intervals between adjacent LHBs in touch frame periods are equal through a modulation of touch synchronization signaling the touch display device according to embodiments of the present disclosure.

Referring to FIG. 8, the touch display device 100 according to embodiments of the present disclosure arranges LHBs such that intervals (LT1~LT16) between adjacent LHBs of LHBs (LHB1~LHB16) arranged in touch frame periods are equal by adjusting a pulse width of a touch synchronization signal Tsync through a pulse width modulation (PWM) generator.

To do this, in order for a last LHB (LHB16) arranged within one touch frame period not to evade a vertical blank period Vblank, intervals (LT1~LT16) between adjacent LHBs are uniformly arranged even when a vertical blank period Vblank is located.

The 16th LHB LHB16 may be used as an active driving period for stylus sensing, as a passive driving period for finger sensing, or as a dummy period for one or more other usages.

Like this, in order for intervals (LT1~LT16) between adjacent LHBs to be uniform, starting time points of LHBs (LHB1~LHB16) can be sequentially delayed by dividing a time period of a vertical blank period Vblank into the number of LHBs (here, 16 LHBs), and then, uniformly allocating the divided vertical blank periods to time points at which respective LHBs (LHB1~LHB16) start (e.g., following edges).

Figure 9:
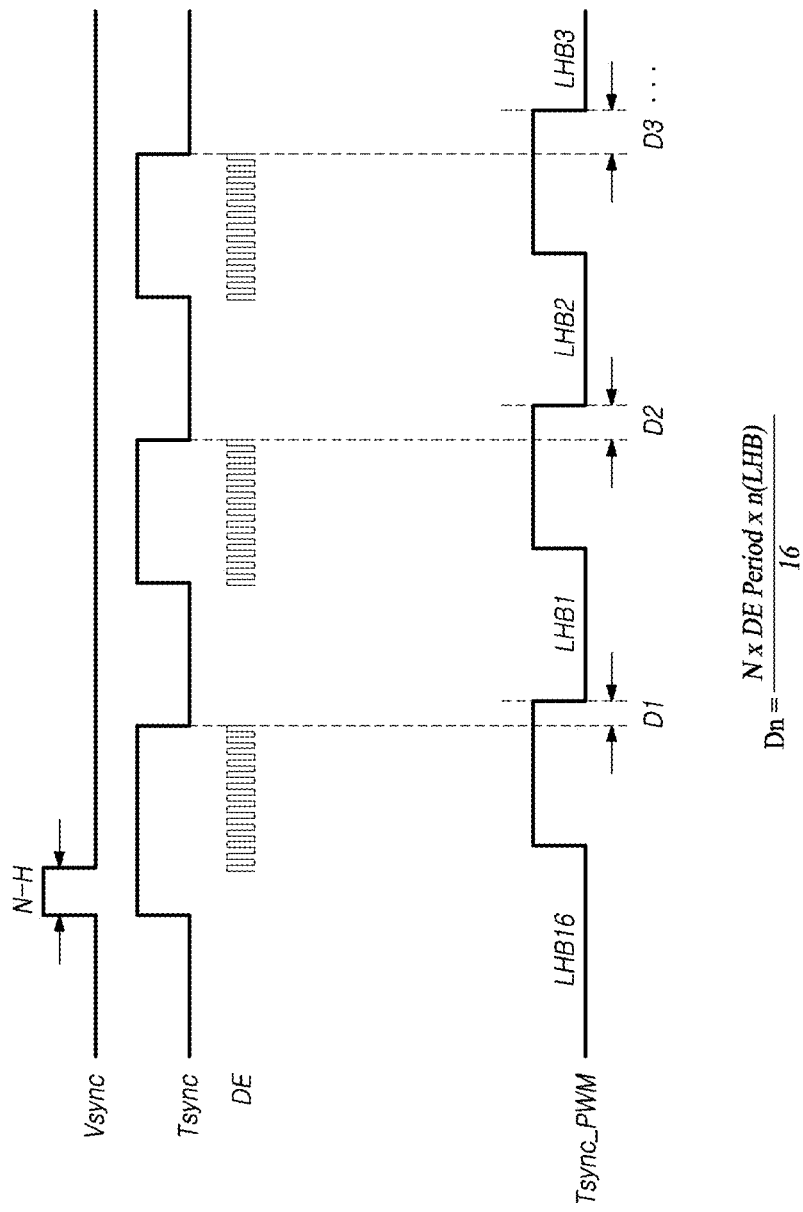
FIG. 9 illustrates signal timing representing a process of configuring intervals between LHBs in a touch frame period to be equal through a modulation of touch synchronization signal in the touch display device according to embodiments of the present disclosure.

FIG. 9 illustrates signal timing representing a process of configuring intervals between LHBs in a touch frame period to be equal through a modulation of touch synchronization signal in the touch display device according to embodiments of the present disclosure.

Referring to FIG. 9, in the touch display device 100 according to embodiments of the present disclosure, a vertical blank period Vblank may be made up of a certain multiple of the horizontal period (N·H). For example, the vertical blank period Vblank may be arranged at a time interval of 5H corresponding to 5 multiples of one horizontal period 1H.

One horizontal period 1H may be varied according to frequency at which the touch display device 100 operates, since a value stored in a memory in the touch display device 100, e.g., an electrically erasable programmable read-only memory (EEPROM) is used for the multiple N of the horizontal period H determining the vertical blank period Vblank, the vertical blank period Vblank can be determined using one horizontal period 1H for displaying images in the touch display device 100.

Since one horizontal period 1H for displaying images in the touch display device 100 is equal to a data enable input period (DE Period) in which a data enable signal DE is applied to a display panel 110 during one frame, one horizontal period 1H can be derived by measuring the data enable input period (DE Period) in which the data enable signal DE is applied to the display panel 110 during one frame.

For example, when a vertical blank period Vblank is 5H, and one horizontal period 1H is 32 μs, a corresponding vertical blank period Vblank is 160 μs obtained by multiplying 32 μs by 5.

If 16 LHBs are included in one touch frame period, time delays (D1~D16) of 10 μs obtained by dividing 160 μs by 16 can be added to respective LHBs.

Accordingly, for a touch synchronization signal Tsync before LHBs are uniformly arranged, by adding the time delay Dn to each LHB (LHB1~LHB16) in a touch frame period, a modulated touch synchronization signal Tsync_PWM in which LHBs are uniformly arranged can be generated.

Figure 10:
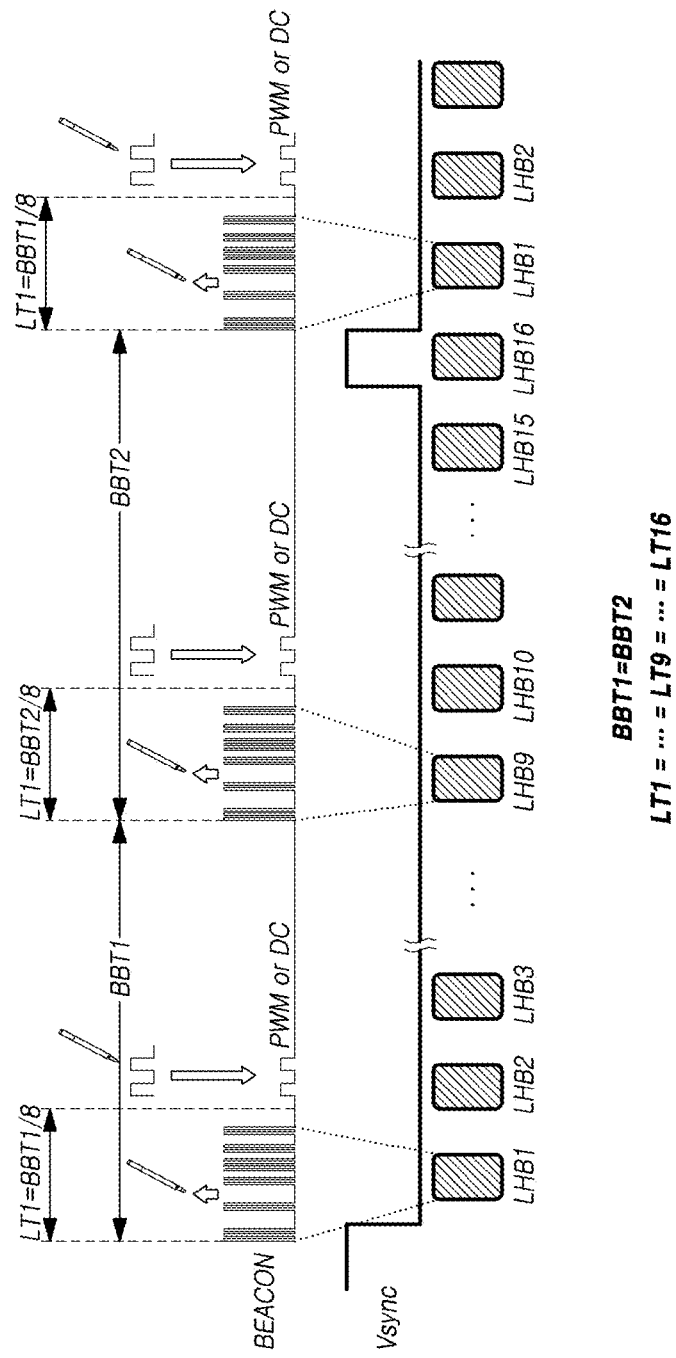
FIG. 10 illustrates signal timing when intervals between LHBs in the touch frame periods are equally arranged in the touch display device according to embodiments of the present disclosure.

FIG. 10 illustrates signal timing when intervals between LHBs in the touch frame periods are equally arranged in the touch display device according to embodiments of the present disclosure.

Referring to FIG. 10, in the touch display device 100 according to embodiments of the present disclosure, a modulated touch synchronization signal Tsync_PWM is generated such that intervals (LT1~LT16) between adjacent LHBs of 16 LHBs (LHB1~LHB16 and LHB1) arranged in touch frame periods are equal regardless of a vertical blank period Vblank arranged between touch frame periods.

A method of generating the modulated touch synchronization signal Tsync_PWM such that the intervals (LT1~LT16) between adjacent LHBs of 16 LHBs (LHB1~LHB16) arranged in the touch frame periods are equal can be performed, as described above, by modulating a touch synchronization signal Tsync such that starting time points of LHBs (LHB1~LHB16) are sequentially delayed by dividing a time period of the vertical blank period Vblank into the number of LHBs (here, 16 LHBs), and then, uniformly allocating the divided vertical blank periods to time points at which respective LHBs (LHB1~LHB16) start (e.g., following edges).

In this case, when beacon signals are included in a first LHB LHB1 and a 9th LHB LHB9, a time interval BBT1 between the beacon signal of the first LHB LHB1 and the beacon signal of the 9th LHB LHB9 can be equal to a time interval BBT2 between the beacon signal of the 9th LHB LHB9 and a beacon signal of a first LHB LHB1 in a consecutive touch frame period.

Accordingly, all intervals (LT1~LT8) between adjacent LHBs from the first to 9th LHBs (LHB1~LHB9) may be determined to be equal to intervals (LT9~LT16) between adjacent LHBs from the 9th LHB LHB9 to a first LHB LHB1 included in a consecutive touch frame period.

As a result, since time intervals (LT1~LT16) between adjacent LHBs of all LHBs (LHB1~LHB16) included in one touch frame period are equal, the touch display device can arrange LHBs at the equal time interval (LT=LT1= . . . =LT16) from a time point at which the touch frame period starts, and transmit an uplink signal to a stylus in a corresponding LHB or receive a downlink signal from the stylus.

Through this, it is possible to configure simply an associated system for transmitting signals between the touch display device 100 and the stylus.

Further, after transmitting a beacon signal Beacon at a first LHB LHB1 in one touch frame period, since synchronization can be performed through the interval LT between LHBs without transmitting a beacon signal Beacon in consecutive LHBs, it is therefore possible to reduce power consumption of the stylus.

Further, even when transmitting a beacon signal Beacon only at a first LHB LHB1 in one touch frame period, since synchronization can be performed in the touch frame period, it is therefore possible to improve touch sensitivity by enabling remaining LHBs (LHB2~LHB16) to be used as touch sensing periods.

Further, even when noises are included in the LHB LHB1 at which the beacon signal Beacon is transmitted, since time intervals (LT1~LT16) of remaining LHBs (LHB2~LHB16) are equal, synchronization between the touch display device 100 and the stylus can be performed.

The touch driving method according to the embodiments of the present disclosure can be applied to a stylus driving method implemented by other protocols.

Figure 11:
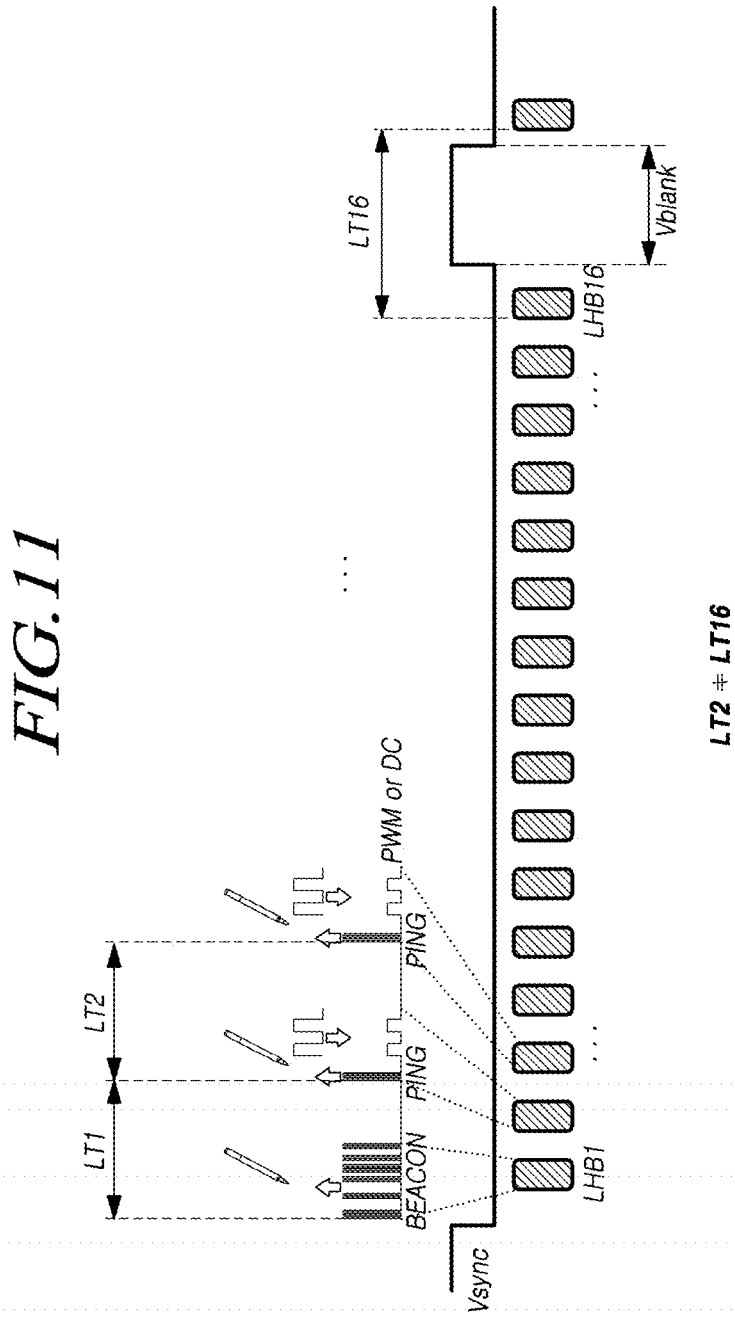
FIG. 11 illustrates another example of showing a situation where intervals between LHBs are not equal in the touch frame period in a touch display device.

FIG. 11 illustrates another example of showing a situation where intervals between LHBs are not equal in the touch frame period in a touch display device.

FIG. 11 illustrates a case where a protocol is used of enabling the touch display device 100 to transmit a beacon signal Beacon at a first LHB LHB1, as an uplink signal for controlling the driving of a stylus, transmit a ping signal Ping at a partial period of each LHB from a second LHB LHB2 to a 16th LHB LHB16, and receive a downlink signal from the stylus at the remaining period of each LHB from the second LHB LHB2 to the 16th LHB LHB16.

The stylus receives an uplink signal through one or more of a plurality of touch electrodes TE included in the display panel 110, and outputs, to the display panel 110, a downlink signal indicating a location, a tilt, or several types of additional information on the stylus in response to the uplink signal at the remaining period of the LHB except for the partial period for transmitting the ping signal Ping.

Likewise, the beacon signal Beacon may include one or more of basic information of the display panel 110 (e.g., state information, identification information, type information such as in-cell type, or the like), driving mode information of the display panel 110 (e.g., mode identification information, such as stylus search mode, stylus sensing mode, or the like), characteristic information on a downlink signal (e.g., frequency, the number of pulses, or the like), driving timing related information, multiplexer driving information, power mode information (e.g., information on one or more LHB(s) not driven in a display panel and a stylus for reducing power consumption), and may further include information for synchronization between the display panel 110 and the stylus.

The ping signal Ping may be a control signal for synchronization of a downlink signal.

The additional information included in the downlink signal transmitted from the stylus may include, for example, one or more of pressure, stylus ID information, button information, battery information, and information for checking and correcting errors for information.

Even in the case of the signal transmitting system according to such a protocol, a vertical blank period Vblank for discerning frames is arranged between touch frame periods.

Even in this case, since 16 LHBs (LHB1~LHB16) for touch driving are arranged in a remaining period except for the vertical blank period Vblank in a touch frame period, there occurs an asymmetric phenomenon in which intervals between adjacent LHBs of the 16 LHBs (LHB1~LHB16) included in the touch frame period and an interval between the 16th LHB (LHB16) and a first LHB LHB1 included in a consecutive touch frame period are not equal.

Accordingly, there occurs a problem that a system for transmitting signals between the touch display device 100 and the stylus is complicated, and in order to reduce an LHB asymmetric period, it is necessary for a plurality beacon signals Beacon to be transmitted in one touch frame period. Therefore, since power consumption of the stylus is increased and corresponding touch sensing period is reduced, there arises a problem that touch sensitivity is deteriorated.

Like this, even when transmitting a beacon signal Beacon at a first LHB LHB1, and processing both a ping signal Ping and a downlink signal in one or more LHBs from a second LHB LHB2 to a 16th LHB LHB16, intervals between LHBs in the touch frame period in an embodiment of present disclosure can be equally arranged regardless of a vertical blank period Vblank.

Figure 12:
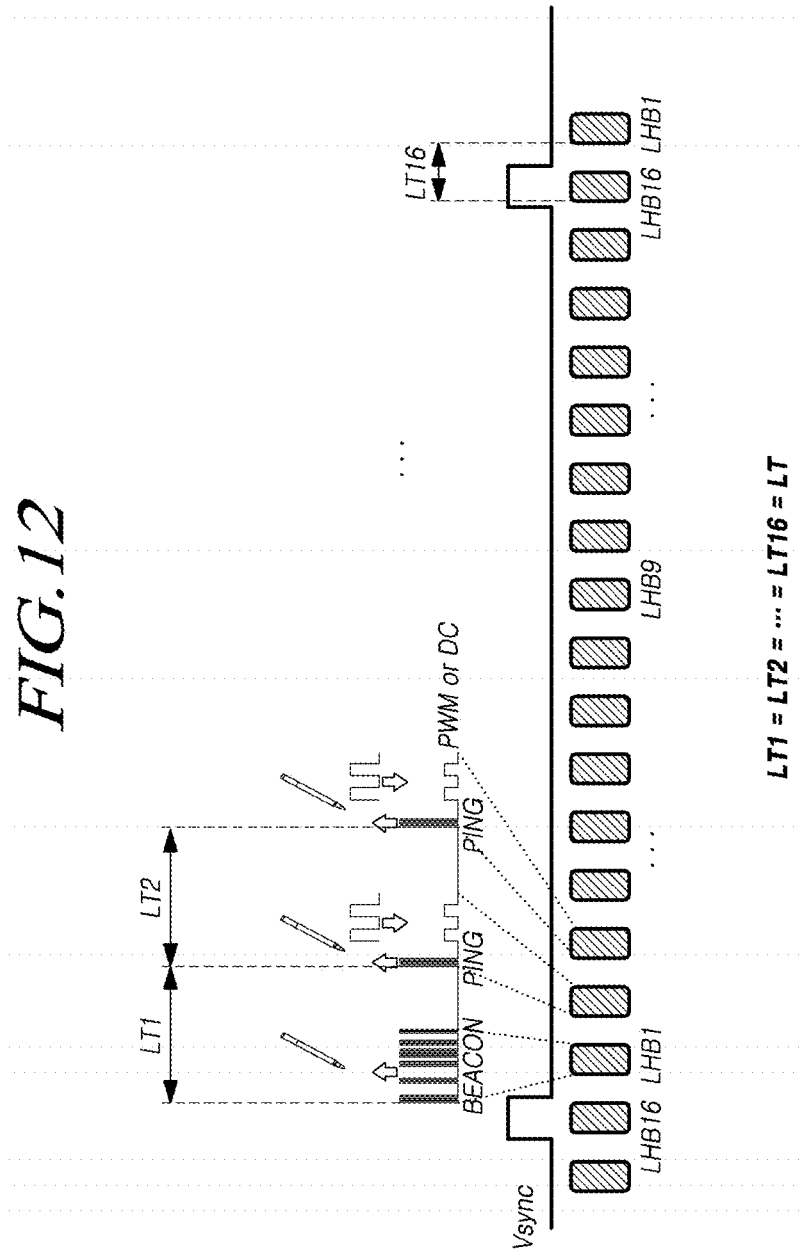
FIG. 12 illustrates another signal timing when intervals between LHBs in the touch frame periods are equally arranged in the touch display device according to embodiments of the present disclosure.

FIG. 12 illustrates another signal timing when intervals between LHBs in the touch frame periods are equally arranged in the touch display device according to embodiments of the present disclosure.

Referring to FIG. 12, in the touch display device 100 according to embodiments of the present disclosure, a modulated touch synchronization signal Tsync_PWM is generated such that intervals (LT1~LT16) between adjacent LHBs of 16 LHBs (LHB1~LHB16 and LHB1) arranged in touch frame periods are equal regardless of a vertical blank period Vblank arranged between touch frame periods.

A method of generating the modulated touch synchronization signal Tsync_PWM such that the intervals (LT1~LT16) between adjacent LHBs of 16 LHBs (LHB1~LHB16) arranged in the touch frame periods are equal can be performed, as described above, by modulating a touch synchronization signal Tsync such that starting time points of LHBs (LHB1~LHB16) are sequentially delayed by dividing a time period of the vertical blank period Vblank into the number of LHBs (here, 16 LHBs), and then, uniformly allocating the divided vertical blank periods to time points at which respective LHBs (LHB1~LHB16) start (e.g., following edges).

In this case, when a beacon signal Beacon is included in the first LHB LHB1, and both a ping signal Ping and a downlink signal are included in one or more LHBs from the second LHB LHB2 to the 16th LHB LHB16, a time interval LT1 between the first LHB LHB1 and the second LHB LHB2 may be equal to a time interval LT2 between the second LHB LHB2 and a third LHB LHB3, and likewise, be equal to an interval LT16 between the 16th LHB LHB16 and a first LHB LHB1 included in a consecutive touch frame period.

As a result, since time intervals (LT1~LT16) between adjacent LHBs of all LHBs (LHB1~LHB16) included in one touch frame period are equal, the touch display device can arrange LHBs at the equal time interval (LT= LT1= . . . =LT16) from a time point at which the touch frame period starts, and transmit an uplink signal to a stylus in a corresponding LHB or receive a downlink signal from the stylus.

Through this, it is possible to configure simply an associated system for transmitting signals between the touch display device 100 and the stylus.

Further, since time intervals (LT1~LT16) between adjacent LHBs of all LHBs (LHB1~LHB16) included in one touch frame period are equal, it is unnecessary to transmit a ping signal Ping for synchronization between the touch display device 100 and the stylus for each LHB. In this case, since the ping signal Ping may be needed to be included only in the second LHB LHB2, it is possible to reduce the power consumption of the stylus.

Further, since synchronization can be performed in a touch frame period even when transmitting a beacon signal Beacon only at a first LHB LHB1 and transmitting a ping signal Ping only at a second LHB LHB2, in one touch frame period, it is therefore possible to improve touch sensitivity by enabling remaining LHBs (LHB3~LHB16) to be used as touch sensing periods.

Further, even when noises are included in the LHB LHB1 at which the beacon signal Beacon is transmitted, since time intervals (LT1~LT16) of remaining LHBs (LHB2~LHB16) are equal, synchronization between the touch display device 100 and the stylus can be performed.

Since intervals between adjacent LHBs in a touch frame period are arranged to be equal, the touch display device 100 according to embodiments of the present disclosure can sense more accurately a downlink signal from the stylus.

Figure 13:
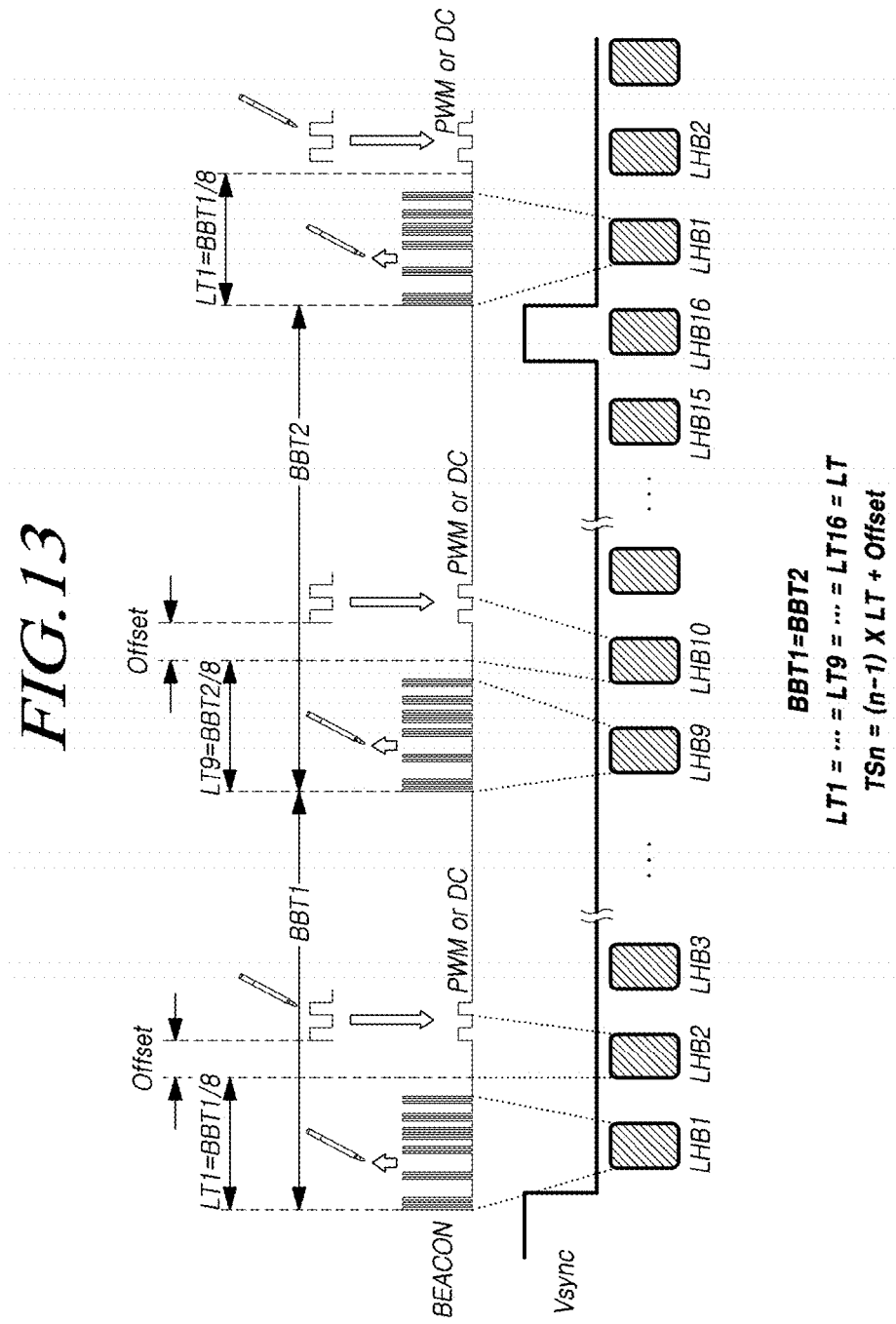
FIG. 13 illustrates signal timing when sensing a downlink signal transmitted from a stylus in the touch display device according to embodiments of the present disclosure.

FIG. 13 illustrates signal timing in a situation where a downlink signal transmitted from a stylus is sensed in the touch display device according to embodiments of the present disclosure.

Referring to FIG. 13, in the touch display device 100 according to embodiments of the present disclosure, a time point of sensing a downlink signal transmitted from a stylus may be a time point at which a pre-configured offset time passes from starting time points of remaining LHBs (LHB2~LHB8, LHB10~LHB16) at which a downlink signal is transmitted except for one or more LHBs (LHB1, LHB9) at which a beacon signal Beacon is transmitted.

As described above, since intervals LT between adjacent LHBs in the touch frame period are equal, time points (TS1~TS16) for sensing downlink signals in each LHB (LHB1~LHB16) may be easily synchronized with time points at which downlink signals from the stylus are received.

That is, since all intervals between adjacent LHBs in a touch frame period are equal, a time point TS1 for sensing a first LHB LHB1 can be an offset time, and a time point TS2 for sensing a second LHB LHB2 can be a time point (LT+Offset) at which the offset time passes from a first interval LT between the first LHB LHB1 and the second LHB LHB2. Likewise, a time point TS16 for sensing a 16th LHB LHB16 can be a time point ((15×LT)+Offset) at which the offset time passes from a 15th interval (15×LT) between a 15th LHB LHB15 and the 16th LHB LHB16. That is, a time point TSn for sensing an nth LHB LHBn may be set to a time point ((n−1)×LT+Offset) at which the offset time passes from an (n−1)th interval between the (n−1)th LHB LHBn−1 and a nth LHB LHBn.

Like this, when intervals LT between adjacent LHBs in a touch frame period are arranged to be equal, it is possible to determine simply and accurately time points for sensing downlink signals transmitted from the stylus.

In the touch display device 100 according to embodiments of the present disclosure, since intervals between adjacent LHBs in a touch frame period are arranged to be equal, it is unnecessary to arrange separately beacon signals Beacon in the one touch frame period.

That is, even when beacon signals Beacon are arranged to be adjacent in a touch frame period without being separately arranged in the touch frame period, since intervals LT between adjacent LHBs can be determined, it is possible to reduce an influence of a noise according to voltage variances.

Figure 14:
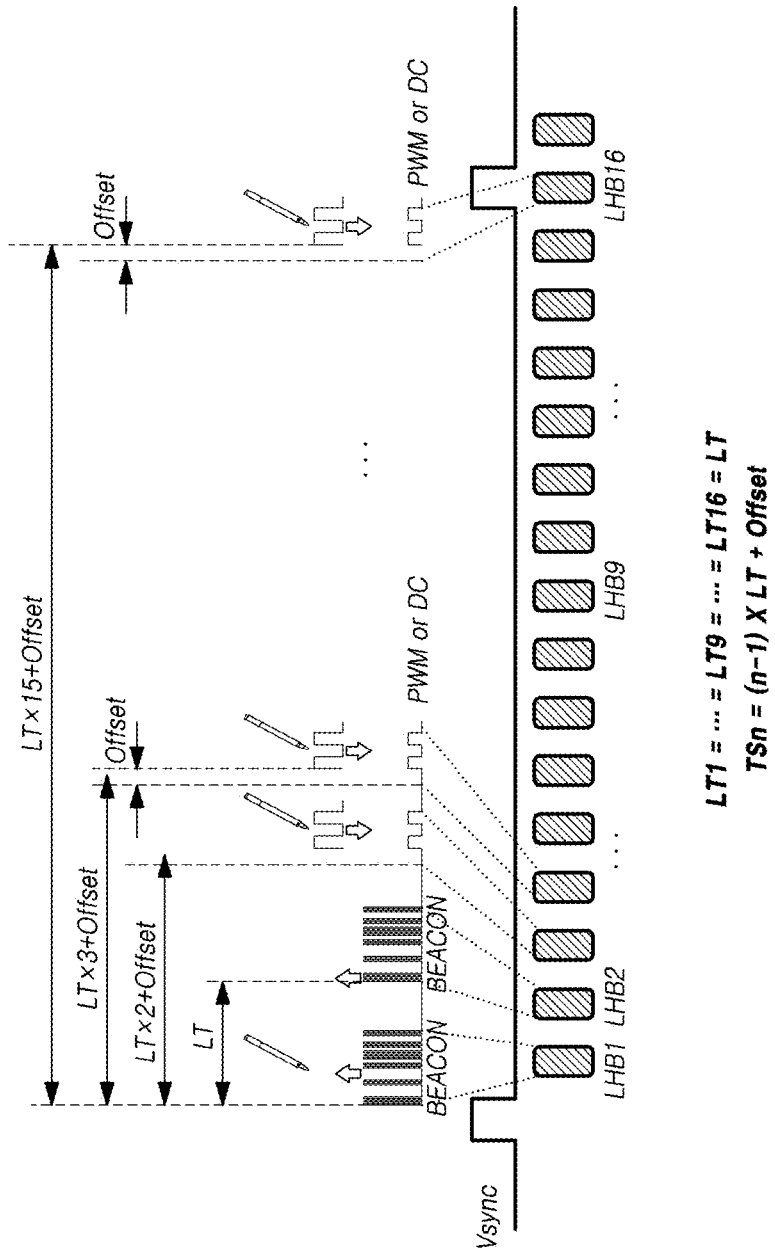
FIG. 14 illustrates signal timing when beacon signals are arranged to be adjacent in the touch frame period in the touch display device according to embodiments of the present disclosure.

FIG. 14 illustrates signal timing when beacon signals are arranged to be adjacent in the touch frame period in the touch display device according to embodiments of the present disclosure.

Referring to FIG. 14, in the touch display device 100 according to embodiments of the present disclosure, a modulated touch synchronization signal Tsync_PWM is generated such that intervals (LT1~LT16) between adjacent LHBs of 16 LHBs (LHB1~LHB16 and LHB1) arranged in touch frame periods are equal.

Further, beacon signals Beacon are arranged to be adjacent in a first LHB LHB1 and a second LHB LHB2.

In this case, a modulated touch synchronization signal Tsync_PWM is generated such that intervals (LT1~LT16) between adjacent LHBs of 16 LHBs (LHB1~LHB16 and LHB1) arranged in a touch frame period are equal.

Since the intervals (LT1~LT16) between adjacent LHBs are equal in all LHBs (LHB1~LHB16), it is unnecessary to separate a second beacon signal Beacon from a first beacon signal Beacon.

Accordingly, by transmitting beacon signals at the first LHB LHB1 and the second LHB LHB2, it is possible to determine an interval LT between LHBs quickly.

After the interval LT between the LHBs is determined, as described above, time points (TS1~TS16) for sensing downlink signals for each LHB (LHB1~LHB16) can be accurately synchronized with time points at which the downlink signals from the stylus are received.

That is, since all intervals between adjacent LHBs in a touch frame period are equal, a time point TS3 for sensing a third LHB LHB3 can be a time point ((2×LT)+Offset) at which an offset time passes from a second interval (2×LT) between a second LHB LHB2 and the third LHB LHB3. Likewise, a time point TS16 for sensing a 16th LHB LHB16 can be a time point ((15×LT)+Offset) at which the offset time passes from a 15th interval (15×LT) between a 15th LHB LHB15 and the 16th LHB LHB16.

Like this, when intervals LT between adjacent LHBs in a touch frame period are arranged to be equal, it is possible to determine simply and accurately time points for sensing downlink signals transmitted from the stylus.

Through this, comparing with a case where beacon signals are separately arranged, it is possible to reduce an influence of a noise according to voltage variances.

The touch display device 100 according to embodiments of the present disclosure may be applied to a stylus protocol using both a beacon signal Beacon and a ping signal Ping.

Figure 15:
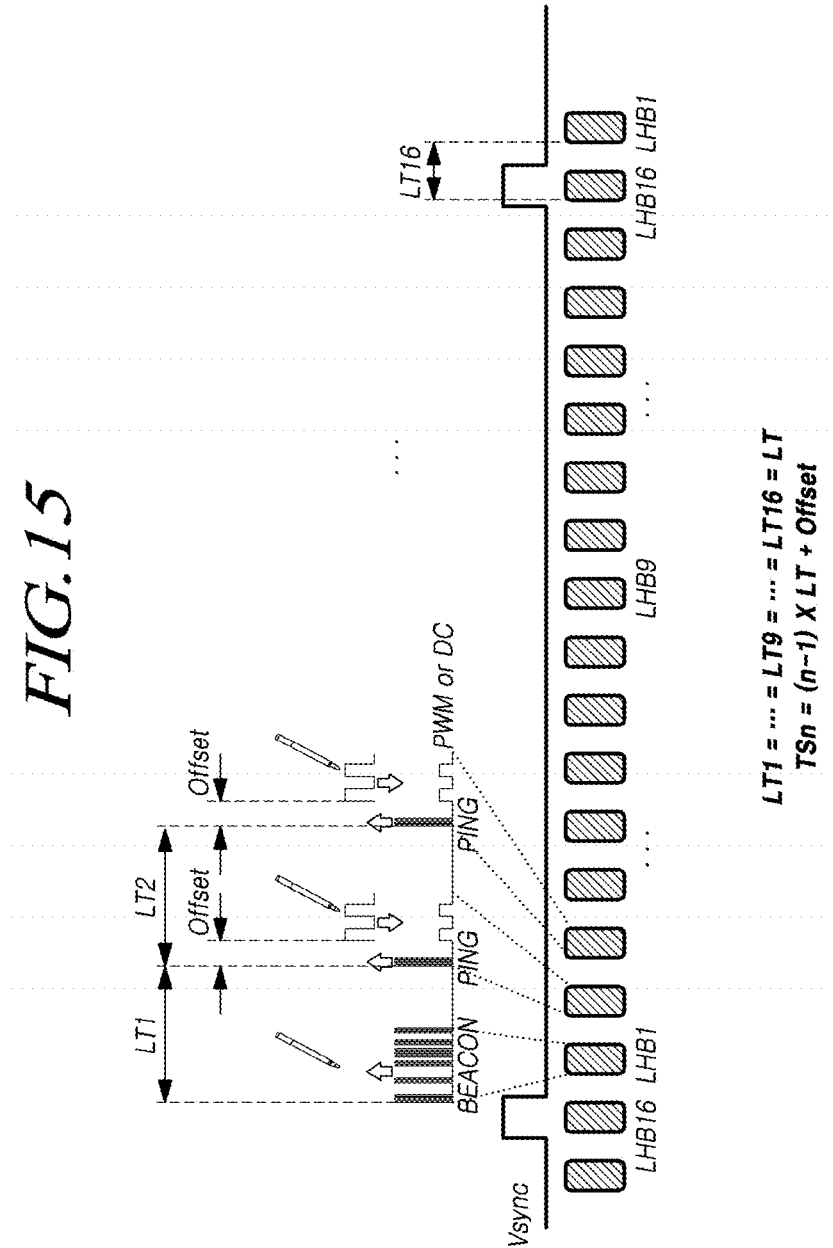
FIG. 15 illustrates signal timing when sensing a downlink signal for a protocol of performing synchronization using both a beacon signal and a ping signal in the touch display device according to embodiments of the present disclosure.

FIG. 15 illustrates signal timing when sensing a downlink signal for a protocol of performing synchronization using both a beacon signal and a ping signal in the touch display device according to embodiments of the present disclosure.

Referring to FIG. 15, in the touch display device 100 according to embodiments of the present disclosure, a time point for sensing a downlink signal transmitted from a stylus may be a time point at which a pre-configured offset time passes from starting time points of remaining LHBs (LHB2~LHB16) at which ping signals Ping are transmitted except for an LHB LHB1 at which a beacon signal Beacon is transmitted.

As described above, since intervals LT between adjacent LHBs in the touch frame period are equal, time points (TS1~TS16) for sensing downlink signals in each LHB (LHB1~LHB16) may be easily synchronized with time points at which downlink signals from the stylus are received.

That is, since all intervals between adjacent LHBs in a touch frame period are equal, a time point TS2 for sensing a second LHB LHB2 can be a time point (LT+Offset) at which an offset time passes from a first interval LT between a first LHB LHB1 and the second LHB LHB2. Likewise, a time point TS16 for sensing a 16th LHB LHB16 can be a time point ((15×LT)+Offset) at which the offset time passes from a 15th interval (15×LT) between a 15th LHB LHB15 and the 16th LHB LHB16.

Like this, when intervals LT between adjacent LHBs in a touch frame period are arranged to be equal, it is possible to determine simply and accurately time points for sensing downlink signals transmitted from the stylus.

In the touch display device 100 according to embodiments of the present disclosure, since intervals between adjacent LHBs in a touch frame period are arranged to be equal, it is unnecessary to transmit ping signals Ping through a plurality of LHBs.

That is, even when a ping signal Ping is transmitted once between beacon signals Beacon in a touch frame period, since intervals between LHBs in the touch frame period can be arranged to be equal, it is possible to improve touch sensing sensitivity and reduce an influence of a noise.

Figure 16:
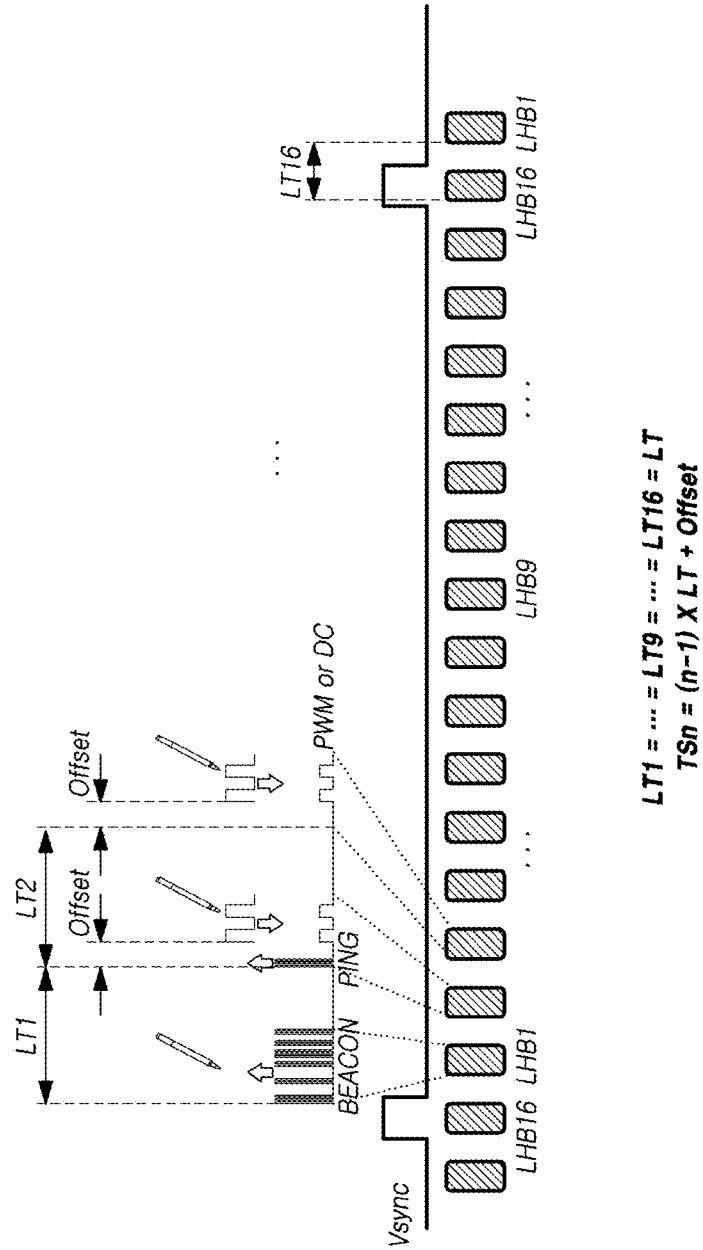
FIG. 16 illustrates signal timing when performing synchronization and sensing of a downlink signal by using a beacon signal and a ping signal only once in the touch display device according to embodiments of the present disclosure.

FIG. 16 illustrates signal timing when performing synchronization and sensing of a downlink signal by using a beacon signal and a ping signal only once in the touch display device according to embodiments of the present disclosure.

Referring to FIG. 16, in the touch display device 100 according to embodiments of the present disclosure, a time point for sensing a downlink signal transmitted from a stylus may be, as described above, a time point at which a pre-configured offset time passes from starting time points of remaining LHBs (LHB2~LHB16) at which ping signals Ping are transmitted except for an LHB LHB1 at which a beacon signal Beacon is transmitted.

Accordingly, since all intervals LT between adjacent LHBs in the touch frame period are equal, time points (TS1~TS16) for sensing downlink signals in each LHB (LHB1~LHB16) may be easily synchronized with time points at which downlink signals from the stylus are received.

In this case, since a modulated touch synchronization signal Tsync_PWM is generated such that all intervals LT between the LHBs are equal in the touch frame period, a beacon signal Beacon and a ping signal Ping for determining an interval LT between LHBs may be transmitted only once in respective periods adjacent to each other.

For example, in a situation where a beacon signal Beacon is transmitted at a first LHB LHB1 and a ping signal Ping is transmitted at a second LHB LHB2, since all intervals LT between adjacent LHBs in a touch frame period are equal to an interval LT1 between the first LHB LHB1 and the second LHB LHB2, it is no longer necessary to transmit a ping signal Ping from the touch display device 100 to the stylus from a third LHB LHB3 for synchronizing between the touch display device 100 and the stylus.

As a result, by reducing the number of ping signals Ping in the touch frame period, touch sensing sensitivity can be improved and an influence of a noise can be reduced.

Meanwhile, in order to sense a stylus or a finger in one or more LHBs, one or more touch driving signals in the form of pulse width modulation (PWM) or direct current (DC) may be applied to one or more touch electrodes TE or a common electrode.

A ping signal Ping included in one LHB and a touch driving signal may have different magnitudes or levels of voltage, and typically, a voltage level of the ping signal is greater than that of the touch driving signal.

As a result, after a ping signal Ping is provided from a touch electrode TE to the stylus in an LHB, the delay and distortion of a signal may occur in a process of being changed to a touch driving signal with a lower level for touch sensing.

Figure 17:
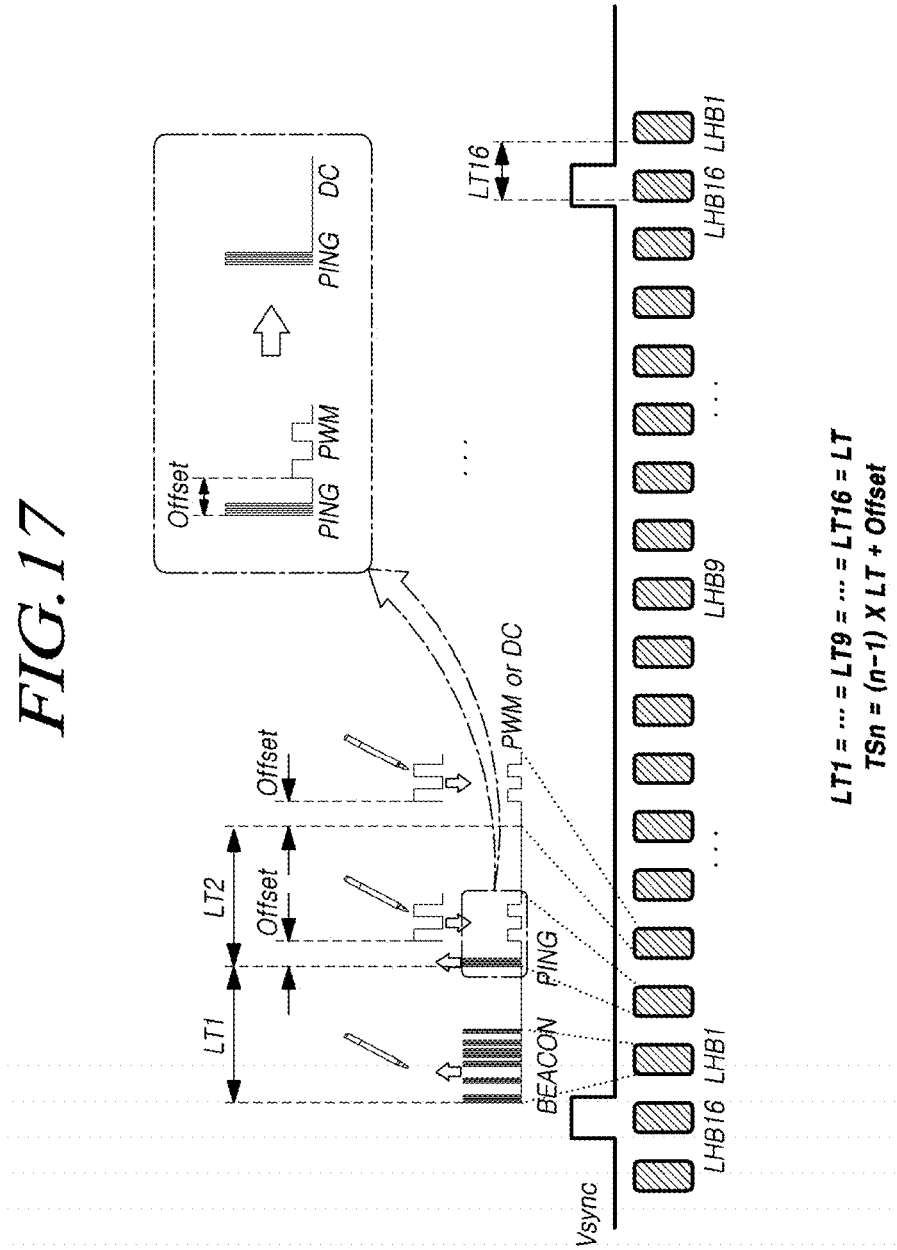
FIG. 17 illustrates signal timing when applying a DC touch driving signal at an LHB at which a ping signal is applied in the touch display device according to embodiments of the present disclosure.

FIG. 17 illustrates signal timing when applying a DC touch driving signal at an LHB at which a ping signal is applied in the touch display device according to embodiments of the present disclosure.

Referring to FIG. 17, when ping signals Ping are applied at all LHBs, the delay and distortion of such signals have not been prevented. However, in the touch display device 100 according to embodiments of the present disclosure, since a ping signal Ping is transmitted once after a beacon signal Beacon is applied in a touch frame period, the delay and distortion of the signal have been reduced by applying a touch driving signal with a direct current (DC) at an LHB at which the ping signal Ping is applied.

That is, since the LHB at which the ping signal Ping is applied corresponds to one of 16 LHBs, and the touch driving signal with a direct current (DC), not the pulse width modulation (PWM), is applied at the LHB including the ping signal Ping, the corresponding LHB may be used as a stylus-dedicated sensing period.

Here, since one or more touch driving signals with the pulse width modulation (PWM) or the direct current (DC) can be applied at remaining LHBs at which the ping signal Ping is not applied, both stylus sensing and finger sensing can be performed.

Figure 18:
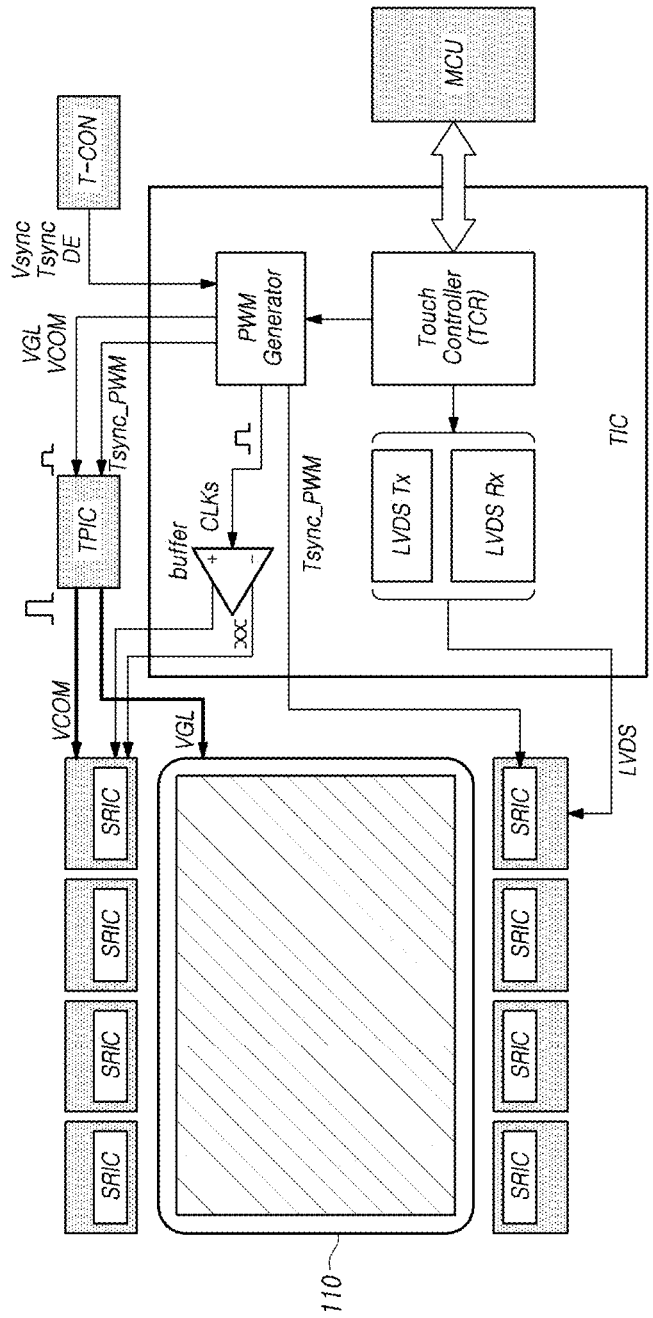
FIG. 18 illustrates a block diagram of the touch display device according to embodiments of the present disclosure.

FIG. 18 illustrates a block diagram of the touch display device according to embodiments of the present disclosure.

Referring to FIG. 18, the touch display device 100 according to embodiments of the present disclosure can arrange LHBs such that intervals between adjacent LHBs in a touch frame period are equal using a pulse width modulation (PWM) generator.

The touch display device 100 according to embodiments of the present disclosure may include a touch circuit TIC for performing touch sensing and stylus sensing by using signals received through a display panel 110 by driving the display panel 110 in which a touch screen panel TSP is integrated.

The touch circuit TIC may include a first circuit receiving signals through the display panel 110 by driving the display panel 110, and a second circuit for performing passive touch sensing (e.g., a finger touch sensing) and active touch sensing using the signals received through the display panel 110.

The first circuit may be referred to as a touch driving circuit ROIC, and the second circuit may be referred to as a touch controller TCR.

The touch driving circuit ROIC may be implemented as an integrated driving circuit SRIC together with a data driving circuit SDIC driving data lines.

Herein, the touch controller TCR is disposed in the touch circuit TIC, and the integrated driving circuit SRIC is outside of the touch circuit TIC. In another example, the integrated driving circuit SRIC and the touch controller TCR may be implemented in one touch circuit TIC.

A timing controller T-CON provides timing control signals, such as a vertical synchronous signal Vsync, a touch synchronization signal Tsync, a data enable signal DE, and the like from a host system (not shown) to a pulse width modulation (PWM) generator inside of the touch circuit TIC.

The timing controller T-CON controls operations of the display panel 110 based on a scan timing control signal, such as a gate start pulse GSP, a gate shift clock, a gate output enable signal GOE, or the like. Further, the timing controller T-CON controls data applied to the display panel 110 based on a data timing control signal, such as a source sampling clock SSC, a polarity control signal POL, a source output enable signal SOE, or the like.

The touch circuit TIC may be formed on an outside substrate connected to the display panel 110. The touch controller TCR inside of the touch circuit TIC is connected to the display panel 110 through a plurality of sensing lines, and the touch circuit TIC can sense the presence or absence or a location of a touch from a stylus or a finger based on a difference in capacitance between touch electrodes TE formed on the display panel 110.

The touch controller TCR can transmit a signal to or receive a signal from the integrated driving circuit SRIC through one or more of a low-voltage differential signaling (LVDS) interface, a mobile industry processor interface (MIPI), and a serial integrate. Herein, an interface processor (LVDS Tx, LVDS Rx) using the LVDS interface is illustrated as an example.

As a difference in capacitance between a location on which a stylus or a finger is touched and a non-contacted location occurs, the touch circuit TIC can sense the presence or absence or a location of a touch using a method of sensing the difference in capacitance, and generate touch sensing signals for the presence or absence and the location of the touch and transmit the generated signals to a micro controller MCU.

The pulse width modulation (PWM) generator inside of the touch circuit TIC is controlled by the touch controller TCR, and generates a modulated touch synchronization signal Tsync_PWM, a gate low voltage VGL, and a common voltage VCOM using a vertical synchronous signal Vsync, a touch synchronization signal Tsync and a data enable signal DE provided from the timing controller T-CON.

The modulated touch synchronization signal Tsync_PWM is a signal generated for enabling intervals between LHBs to be arranged equally in a touch frame period. The modulated touch synchronization signal Tsync_PWM is provided to a touch power integrated circuit TPIC and the integrated driving circuit SRIC.

The touch power integrated circuit TPIC generates a touch driving signal TDS with an amplitude between a common voltage VCOM with a low level and a common voltage VCOM with a high level using the common voltage VCOM provided from the pulse width modulation (PWM) generator.

Further, the touch power integrated circuit TPIC receives a DC gate low voltage VGL from the pulse width modulation (PWM) generator, and the gate low voltage VGL is a voltage capable of turning on a thin film transistor (TFT) provided in the display panel 110.

Further, the pulse width modulation (PWM) generator can generate sensing clocks CLKs and provide the generated clocks to the integrated driving circuit SRIC for sensing a touch signal by a touch from a stylus or a finger applied through the display panel 110 during a touch driving period. The sensing clocks CLKs provided from the pulse width modulation (PWM) generator may be provided to the integrated driving circuit SRIC through a buffer.

The micro controller MCU may be implemented as one integrated circuit (IC) together with the touch circuit TIC, or implemented as one integrated circuit (IC) together with the timing controller T-CON.

As described above, in the touch circuit TIC, the touch display device 100, and the touch driving method according to embodiments of the present disclosure, by uniformly arranging intervals of a touch driving period in a touch frame period, it is possible to configure simply a system for transmitting signals between the touch display device 100 and a stylus.

In accordance with embodiments of the present disclosure, it is possible to reduce the number of beacon signals in a touch frame period, reduce power consumption of a stylus, and improve touch sensitivity, by uniformly arranging intervals of a touch driving period in the touch frame.

In accordance with embodiments of the present disclosure, even when noises are included in a period in which a beacon signal is transmitted, since synchronization between a touch display device and a stylus can be maintained in one or more remaining periods, it is possible to improve the accuracy of touch sensing.

It will be apparent to those skilled in the art that various modifications and variations can be made in the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a display panel on which a touch screen panel including a plurality of touch electrodes is integrated; and
a touch circuit configured to generate a touch synchronization signal in which intervals between a plurality of touch driving periods are uniform in at least one touch frame period including a vertical blank period, the touch driving periods including at least first, second, and third touch driving periods, and configured to provide a first beacon signal in the first touch driving period, a second beacon signal in the second touch driving period, and a third beacon signal in the third touch driving period to the display panel according to the generated touch synchronization signal,
wherein at least one of the first beacon signal, the second beacon signal, and the third beacon signal is an uplink signal configured to be provided to a stylus through the plurality of touch electrodes of the display panel, and
wherein a first time interval between a start of the first beacon signal and a start of the second beacon signal has a same length as a second time interval between the start of the second beacon signal and a start of the third beacon signal.

2. The touch display device according to claim 1, wherein the touch circuit is configured to generate the touch synchronization signal in which the intervals between the plurality of touch driving periods are uniform by dividing the vertical blank period by the number of the touch driving periods included in one of the at least one touch frame period and adding the divided time intervals into respective touch driving periods.

3. A touch display device, comprising:
a display panel on which a touch screen panel including a plurality of touch electrodes is integrated; and
a touch circuit configured to generate a touch synchronization signal in which intervals between a plurality of touch driving periods are uniform in a touch frame period including a vertical blank period, and configured to provide an uplink signal to a stylus through the display panel according to the generated touch synchronization signal, the touch driving periods including at least first and second touch driving periods,
wherein the uplink signal includes a beacon signal provided in the first touch driving period and a ping signal provided in the second touch driving period in the touch frame period, the ping signal not provided after the second touch driving period in the touch frame period.

4. The touch display device according to claim 3, wherein the intervals between the plurality of touch driving periods correspond to an interval between a start of the beacon signal and a start of the ping signal.

5. The touch display device according to claim 3, wherein the touch circuit is further configured to provide a touch driving signal to at least one of the touch electrodes in the second touch driving period, the touch driving signal being a direct current signal.

6. The touch display device according to claim 1, wherein the touch circuit is further configured to provide a touch sensing signal for sensing a downlink signal provided from the stylus at a time at which a certain offset time passes from at least one of the intervals between the touch driving periods.

7. A touch driving method, comprising:
generating a touch synchronization signal in which intervals between a plurality of touch driving periods are uniform in at least one touch frame period including a vertical blank period, the touch driving periods including at least first, second, and third touch driving periods; and
providing a first beacon signal in the first touch driving period, a second beacon signal in the second touch driving period, and a third beacon signal in the third touch driving period to a display panel according to the touch synchronization signal,
wherein at least one of the first beacon signal, the second beacon signal, and the third beacon signal is an uplink signal configured to be provided to a stylus through a plurality of touch electrodes of the display panel, and
wherein a first time interval between a start of the first beacon signal and a start of the second beacon signal has a same length as a second time interval between the start of the second beacon signal and a start of the third beacon signal.

8. The touch driving method according to claim 7, wherein the generating of the touch synchronization signal comprises:
dividing the vertical blank period by the number of the touch driving periods included in one of the at least one touch frame period; and
adding the divided time intervals into respective touch driving periods.

9. A touch driving method, comprising:
generating a touch synchronization signal in which intervals between a plurality of touch driving periods are uniform in a touch frame period including a vertical blank period, the touch driving periods including at least first and second touch driving periods; and
providing an uplink signal to a stylus through a display panel according to the touch synchronization signal, wherein the uplink signal includes a beacon signal provided in the first touch driving period and a ping signal provided in the second touch driving period in the touch frame period, the ping signal not provided after the second touch driving period in the touch frame period.

10. The touch driving method according to claim 9, wherein the intervals between the plurality of touch driving periods correspond to an interval between a start of the beacon signal and a start of the ping signal.

11. The touch driving method according to claim 7, further comprising sensing a downlink signal provided from the stylus at a time at which a certain offset time from at least one of the intervals between the touch driving periods passes.

12. The touch display device according to claim 1, wherein at least one of the first beacon signal, the second beacon signal, and the third beacon signal includes at least one of a basic information of the display panel, driving mode information of the display panel, characteristic information on a downlink signal, driving timing related information, multiplexer driving information, power mode information, and information for synchronization between the display panel and the stylus.

13. The touch display device according to claim 12, wherein the driving mode information of the display panel includes a stylus search mode or a stylus sensing mode.

14. The touch display device according to claim 1, wherein the stylus is configured to calculate the time interval between the first touch driving period and the second touch driving period based on the first beacon signal and the second beacon signal.

15. Touch display device according to claim 1, wherein the plurality of touch driving periods further includes a fourth touch driving period between the first touch driving period and the second touch driving period, wherein the touch circuit is further configured to provide a touch driving signal to the plurality of touch electrodes of the display panel for sensing a touch by the stylus or another object during the fourth touch driving period, and wherein an amplitude of the first beacon signal is larger than an amplitude of the touch driving signal.

16. The touch driving method according to claim 7, wherein at least one of the first beacon signal, the second beacon signal, and the third beacon signal includes at least one of a basic information of the display panel, driving mode information of the display panel, characteristic information on a downlink signal, driving timing related information, multiplexer driving information, power mode information, and information for synchronization between the display panel and the stylus.

17. The touch driving method according to claim 16, wherein the driving mode information of the display panel includes a stylus search mode or a stylus sensing mode.

18. The touch driving method according to claim 7, further comprising calculating a time interval between the first touch driving period and the second touch driving period based on the first beacon signal and the second beacon signal.

19. The touch driving method according to claim 7, wherein the plurality of touch driving periods further includes a fourth touch driving period between the first touch driving period and the second touch driving period, wherein the method further comprises applying a touch driving signal to the plurality of touch electrodes of the display panel for sensing a touch by the stylus or another object during the fourth touch driving period, and wherein an amplitude of the first beacon signal is larger than an amplitude of the touch driving signal.

* * * * *